(12) United States Patent  
Counts et al.

(10) Patent No.: US 11,904,531 B2  
(45) Date of Patent: Feb. 20, 2024

(54) METHOD OF THERMALLY TRANSFERRING IMAGES IN A SELECTIVE DEPOSITION BASED ADDITIVE MANUFACTURING SYSTEM

(71) Applicant: Evolve Additive Solutions, Inc., Minnetonka, MN (US)

(72) Inventors: Chris Counts, Crystal, MN (US); J. Samuel Batchelder, Somers, NY (US)

(*) Notice: Subject to any disclaimer, the term of this patent is extended or adjusted under 35 U.S.C. 154(b) by 529 days.

(21) Appl. No.: 16/958,904

(22) PCT Filed: Dec. 28, 2018

(86) PCT No.: PCT/US2018/067926  
§ 371 (c)(1),  
(2) Date: Jun. 29, 2020

(87) PCT Pub. No.: WO2019/133850  
PCT Pub. Date: Jul. 4, 2019

(65) Prior Publication Data  
US 2020/0338813 A1   Oct. 29, 2020

Related U.S. Application Data

(60) Provisional application No. 62/612,081, filed on Dec. 29, 2017.

(51) Int. Cl.  
*G03G 15/00* (2006.01)  
*B29C 64/147* (2017.01)  
(Continued)

(52) U.S. Cl.  
CPC ............ *B29C 64/147* (2017.08); *B33Y 10/00* (2014.12); *G03G 15/224* (2013.01); *B33Y 30/00* (2014.12)

(58) Field of Classification Search  
USPC ..................................................... 156/242  
See application file for complete search history.

(56) References Cited

U.S. PATENT DOCUMENTS 8,488,994 B2   7/2013   Hanson et al.  
8,879,957 B2   11/2014  Hanson et al.  
(Continued)

FOREIGN PATENT DOCUMENTS

WO   2019133850   7/2019

OTHER PUBLICATIONS

"International Preliminary Report on Patentability," for PCT Application No. PCT/US2018/067926 dated Jul. 9, 2020 (10 pages).  
(Continued)

*Primary Examiner* — Quana Grainger  
(74) *Attorney, Agent, or Firm* — Pauly, DeVries Smith & Deffner LLC

(57) ABSTRACT

Disclosed are selective deposition based additive manufacturing systems (10) and methods for printing a 3D part. Layers of a powder material (22) are developed using one or more electrostatography-based engines (12). The layers (22) are transferred for deposition on a part build surface. For each of the layers (22), the part build surface is heated to a temperature within a range between a flowable temperature and a thermal oxidation threshold to form a flowable part build surface, and the developed layer (22) is pressed into contact with the flowable build surface (88) to heat the developed layers (22) to a flowable state and form a new part build surface (88) which is fully consolidated. The new part build surface (88) is then cooled to remove the heat energy added during heating step before repeating the steps for the next developed layer.

18 Claims, 11 Drawing Sheets

(51) Int. Cl.
*B33Y 10/00* (2015.01)
*G03G 15/22* (2006.01)
*B33Y 30/00* (2015.01)

(56) References Cited

U.S. PATENT DOCUMENTS

| | | |
|---|---|---|
| 2013/0075033 A1 | 3/2013 | Chillscyzn et al. |
| 2013/0186549 A1 | 7/2013 | Comb et al. |
| 2013/0186558 A1 | 7/2013 | Comb et al. |
| 2015/0266237 A1 | 9/2015 | Comb et al. |
| 2017/0299973 A1* | 10/2017 | Frauens ............. B29C 64/188 |
| 2017/0326794 A1* | 11/2017 | Facci ............. G03G 15/224 |

OTHER PUBLICATIONS

"International Search Report and Written Opinion," for PCT Application No. PCT/US2018/067926 dated Apr. 29, 2019 (13 pages).

* cited by examiner

METHOD OF THERMALLY TRANSFERRING IMAGES IN A SELECTIVE DEPOSITION BASED ADDITIVE MANUFACTURING SYSTEM

BACKGROUND

The present disclosure relates to systems and methods for additive manufacturing of three-dimensional (3D) parts, and more particularly, to additive manufacturing systems and processes for building 3D parts and their support structures.

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

In an electrostatographic 3D printing process, each slice of the digital representation of the 3D part and its support structure is printed or developed using an electrophotographic engine. The electrostatographic engine uses charged powder materials that are formulated for use in building a 3D part (e.g., a polymeric toner material). The electrostatographic engine typically uses a support drum that is coated with a photoconductive material layer, where latent electrostatic images are formed by electrostatic charging following image-wise exposure of the photoconductive layer by an optical source. The latent electrostatic images are then moved to a developing station where the polymeric toner is applied to charged areas, or alternatively to discharged areas of the photoconductive insulator to form the layer of the charged powder material representing a slice of the 3D part. The developed layer is transferred to a transfer medium, from which the layer is transfused to previously printed layers with heat and pressure to build the 3D part.

In addition to the aforementioned commercially available additive manufacturing techniques, a novel additive manufacturing technique has emerged, where particles are first selectively deposited in an imaging process, forming a layer corresponding to a slice of the part to be made; the layers are then bonded to each other, forming a part. This is a selective deposition process, in contrast to, for example, selective sintering, where the imaging and part formation happens simultaneously. The imaging step in a selective deposition process can be done using electrophotography. In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

In some electrostatographic 3D printing, the processes can be termed sedimentary, with a part under construction being porous at the most recently transferred layer(s). As additional layers are added on top of a layer, the porosity of the layer decreases. In some processes, it has been found that a layer becomes fully fused or consolidated when the layer is between approximately 10 to 20 layers deep into the part.

Porous surface layers of a part under construction can be disadvantageous for a number of reasons. For example, the thermal properties of a porous surface make it hard to heat and cool. The pores make the thermal paths through the polymer tortuous, and the many air-polymer interfaces have impedance mismatches for phonon (heat) transfer. Further, some of the embedded pores become closed cells with the addition of new layers. These become particularly hard to eliminate, as the trapped gas has to be dissolved into the polymer. Porous layers also provide other disadvantages in electrophotographic 3D printing processes, including potentially weakening the part.

SUMMARY

Aspects of the present disclosure are directed toward selective deposition based additive manufacturing systems and methods for printing three-dimensional (3D) structures. Some embodiments of the system include at least one electrostatographic engine configured to develop layers of a powdered material, a transfer medium configured to receive the developed layers from the at least one electrostatographic engine as a single layer or a stack of layers having a thickness, and a build platform. Under the control of a controller, a heater is configured to heat a build surface to a flowable temperature below a thermal oxidation threshold to form a flowable part build surface. The heating is controlled in some aspects to occur in a heat time $\tau_{heat}$ satisfying the relationship $\tau_{heat} < 4\ s^2/\kappa$, where s is a diameter of particles of the powder material and κ is the thermal diffusivity of the powder material. In some embodiments, heating the part build surface to the flowable temperature to form the flowable part build surface occurs in a heat time $\tau_{heat}$ such that a thermal diffusion distance of heat added during the heating is less than four developed layer thicknesses.

Also under the control of a controller, after heating the build surface to form the flowable part build surface, one of the developed layers is pressed into contact with the flowable part build surface to place the flowable part build surface into intimate contact with the developed layer. This heats the developed layers to a flowable state by conduction from the part build surface to form a new part build surface which is fully consolidated. Also under control of a controller, a cooler cools the new part build surface to remove the heat energy added during the heating step, and the heating, pressing and cooling steps are repeated sequentially until all developed layers have been deposited and the part is completed.

An aspect of the present disclosure includes a method for printing a part using an selective deposition based additive manufacturing system. The method can include developing layers of a powder material using at least one electrostatographic engine. The developed layers are transferred from the one or more electrostatographic engines to a transfer medium such as transfer belt. Next, steps of heating, pressing and cooling are performed repeatedly, in sequence, for each of multiple developed layers to be transferred to a build surface of the part.

In the heating step, the part build surface is heated to a flowable temperature below a thermal oxidation threshold to form a flowable part build surface. In some exemplary embodiments, the step of heating the part build surface to the flowable temperature to form the flowable part build surface occurs in a heat time $\tau_{heat}$ satisfying the relationship $\tau_{heat} < 4 s^2/\kappa$, where s is a diameter of particles of the powder material and $\kappa$ is the thermal diffusivity of the powder material. In some embodiments, heating the part build surface to the flowable temperature to form the flowable part build surface occurs in a heat time $T_{heat}$ such that a thermal diffusion distance of heat added during the heating is less than four developed layer thicknesses.

In the pressing step, one of the developed layers on the transfer medium is pressed into contact with the flowable part build surface to place the flowable part surface build surface into intimate contact with the developed layer. This heats the developed layers to a flowable state by conduction from the part build surface to form a new part build surface. In the cooling step, the new part build surface is cooled to remove the heat energy added during the heating step. The heating, pressing and cooling steps are then repeated sequentially until all developed layers have been deposited and the part is completed. By repeating the heating, pressing and cooling steps for each layer to be deposited to the part build surface, the part is built in a layer-by-layer manner, but with each layer being fully consolidated before the next developed layer is deposited. This produces a part with fewer voids or pores, if any, and allows build times for each layer to be reduced.

In accordance with another aspect of the present disclosure, after heating the part build surface to the flowable temperature and prior to pressing one of the developed layers on the transfer medium into contact with the flowable part build surface, the method includes transporting the part build surface to a pressing component over a short time period time $\tau_{trans}$ satisfying the relationship time $\tau_{trans} < 4 s^2/\kappa$, in order to restrict a depth of heat diffusion into the part from the part build surface.

In accordance with another aspect of the present disclosure, the rate at which the part is moved is controlled such that, after pressing a developed layer on the transfer medium into contact with the flowable part build surface, a delay or waiting time of at least a $20^{th}$ of the reputation time $\tau_d$ for the powder material of the developed layer at an interface temperature between the developed layer and the flowable build surface occurs before cooling is initiated to remove heat energy.

In accordance with another aspect of the present disclosure, in the step of cooling the new part build surface to remove heat energy, approximately the same energy flux is removed as was added during the step of heating. By rapidly heating the build surface to form a flowable build surface, pressing a developed layer into the flowable build surface to form a fully consolidated layer of the part, and rapidly cooling the part, degradation of the part material is avoided.

In accordance with another aspect of the present disclosure, the sequential steps of heating, pressing and cooling are all completed in a layer time $\tau_{layer}$ greater than $\tau_{heat}\tau_d/20$, where the $\tau_d$ is the reputation time for the powder material of the developed layer. This layer time can be substantially shorter than a layer time required for conventional EP printing processes, and in some embodiments the layer time is less than one second.

DEFINITIONS

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The term "selective deposition" refers to an additive manufacturing technique where one or more layers of particles are fused to previously deposited layers utilizing heat and pressure over time where the particles fuse together to form a layer of the part and also fuse to the previously printed layer.

The term "electrostatography" refers to the formation and utilization of latent electrostatic charge patterns to form an image of a layer of a part, a support structure or both on a surface. Electrostatography includes, but is not limited to, electrophotography where optical energy is used to form the latent image, ionography where ions are used to form the latent image and/or electron beam imaging where electrons are used to form the latent image.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Figure 1:
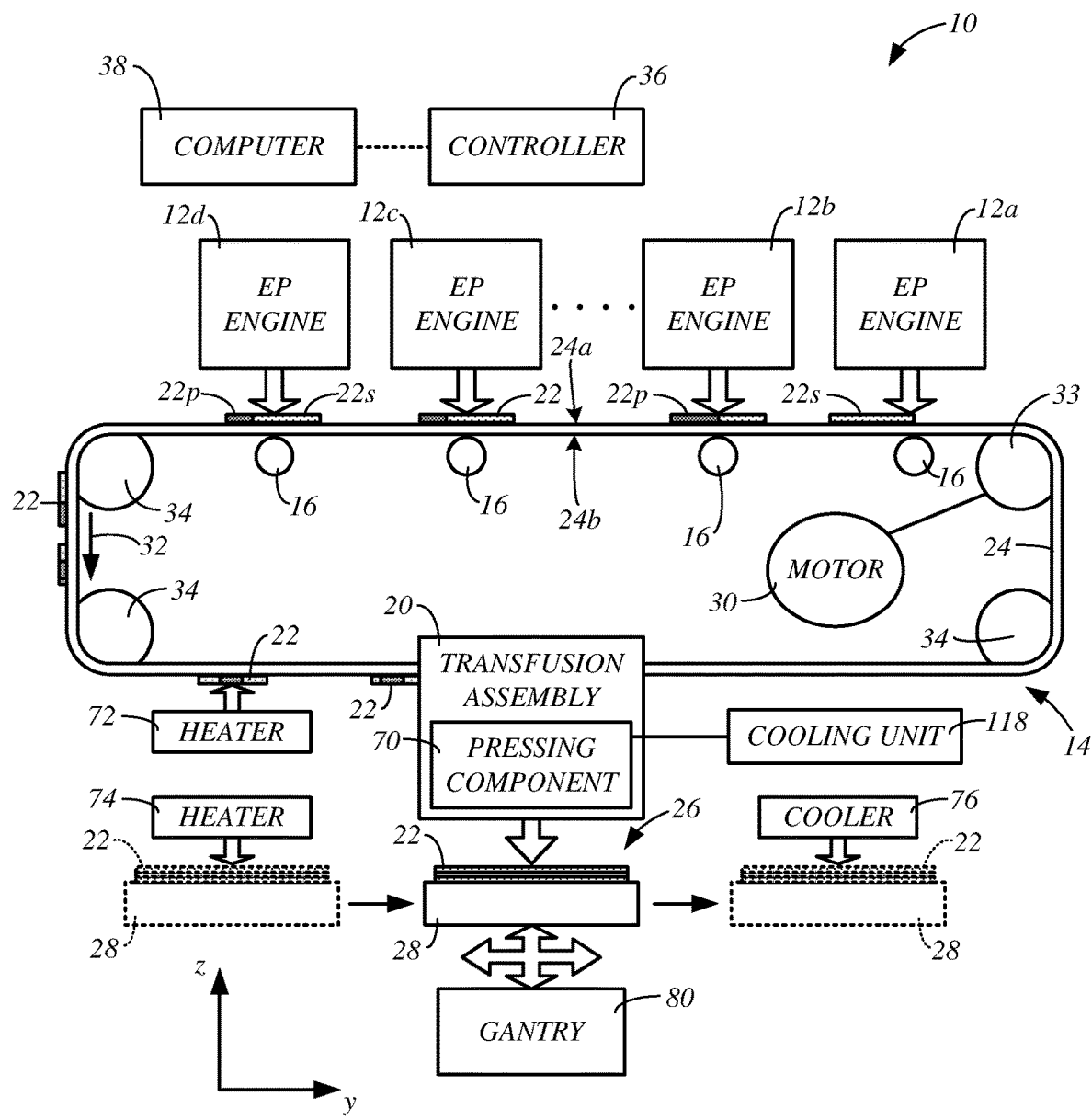
FIG. 1 is a simplified diagram of an exemplary selective deposition based additive manufacturing system for printing 3D parts and associated support structures, in accordance with embodiments of the present disclosure.

Embodiments of the disclosure are described more fully hereinafter with reference to the accompanying drawings. Elements that are identified using the same or similar reference characters refer to the same or similar elements. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

As will further be appreciated by one of skill in the art, the present disclosure may be embodied as methods, systems, devices, and/or computer program products, for example. Accordingly, the present disclosure may take the form of an entirely hardware embodiment, an entirely software embodiment or an embodiment combining software and hardware aspects. The computer program or software aspect of the present disclosure may comprise computer readable instructions or code stored in a computer readable medium or memory. Execution of the program instructions by one or more processors (e.g., central processing unit), such as one or more processors of a controller, results in the one or more processors performing one or more functions or method steps described herein. Any suitable patent subject matter eligible computer-readable media or memory may be utilized including, for example, hard disks, CD-ROMs, optical storage devices, or magnetic storage devices. Such computer-readable media or memory do not include transitory waves or signals.

The computer-readable medium or memory mentioned herein, may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random axis memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As mentioned above, during a selective deposition based 3D part additive manufacturing or printing operation, electrostatographic engines develop each layer of a 3D part out of charged powder materials (e.g., polymeric toners) using the electrophotographic process. A completed layer of the 3D part typically includes a part portion formed of part material by one electrophotographic engine that is transferred to a suitable transfer medium, such as a transfer belt or drum, and/or a support structure portion formed of support material by a different electrophotographic engine that is applied to the transfer medium in registration with the corresponding part portion. Alternatively, the part portion may be developed and transferred to the transfer medium in registration with a previously printed support structure portion on the transfer medium. Further, a plurality of layers can be imaged in a reverse order of printing and stacked one on top of the other on the transfer medium to form a stack of a selected thickness.

The transfer medium delivers the developed layers or the stack of layers to a transfusion assembly where a transfusion process is performed to form a 3D structure in a layer-by-layer manner, a stack-by-stack manner or a combination of individual layers and stacks of layers to form the 3D part and corresponding support structure. During the transfusion process, heat and pressure is applied to fuse the developed layers or stacks of layers to build surfaces of the 3D structure. After printing of the 3D structure is completed, the support structures can then be dissolved or disintegrated in an aqueous solution or dispersion to reveal the completed 3D part.

While the present disclosure can be utilized with any electrostatography-based additive manufacturing system, the present disclosure will be described in association in an electrophotography-based (EP) additive manufacturing system. However, the present disclosure is not limited to an EP based additive manufacturing system and can be utilized with any electrostatography-based additive manufacturing system.

FIG. 1 is a simplified diagram of an exemplary electrophotography-based additive manufacturing system 10 for printing 3D parts and associated support structures in a layer-by-layer manner, in accordance with embodiments of the present disclosure. While illustrated as printing 3D parts and associated support structures in a layer-by-layer manner, the system 10 can also be used to form stacks of layers and transfuses the stacks to form the 3D parts and associated support structures.

As shown in FIG. 1, system 10 includes one or more electrophotographic (EP) engines, generally referred to as 12, such as EP engines 12a-d, a transfer assembly 14, at least one biasing mechanism 16, and a transfusion assembly 20. Examples of suitable components and functional operations for system 10 include those disclosed in Hanson et al., U.S. Pat. Nos. 8,879,957 and 8,488,994, and in Comb et al., U.S. Publication Nos. 2013/0186549 and 2013/0186558.

The EP engines 12 are imaging engines for respectively imaging or otherwise developing completed layers of the 3D part, which are generally referred to as 22, of the charged powder part and support materials. The charged powder part and support materials are each preferably engineered for use with the particular architecture of the EP engines 12. In some embodiments, at least one of the EP engines 12 of the system 10, such as EP engines 12a and 12c, develops layers of the support material to form the support structure portions 22s of a layer 22, and at least one of the EP engines 12, such as EP engines 12b and 12d, develops layers of the part material to form the part portions 22p of the layer 22. The EP engines 12 transfer the formed part portions 22p and the support structure portions 22s to a transfer medium 24. In some embodiments, the transfer medium 24 is in the form of a transfer belt, as shown in FIG. 1. The transfer medium 24 may take on other suitable forms in place of, or in addition to, the transfer belt, such as a transfer drum. Accordingly, embodiments of the present disclosure are not limited to the use of transfer mediums 24 in the form of the transfer belt.

In some embodiments, the system 10 includes at least one pair of the EP engines 12, such as EP engines 12a and 12b, which cooperate to form completed layers 22. In some embodiments, additional pairs of the EP engines 12, such as EP engines 12c and 12d, may cooperate to form other layers 22.

In some embodiments, each of the EP engines 12 that is configured to form the support structure portion 22s of a given layer 22 is positioned upstream from a corresponding EP engine 12 that is configured to form the part portion 22p of the layer 22 relative to the feed direction 32 of the transfer belt 24. Thus, for example, EP engines 12a and 12c that are each configured to form the support structure portions 22s are positioned upstream from their corresponding EP engines 12b and 12d that are configured to form the part portions 22p relative to the feed direction 32 of the transfer belt 24, as shown in FIG. 1. In alternative embodiments, this arrangement of the EP engines 12 may be reversed such that the EP engines that form the part portions 22p may be located upstream from the corresponding EP engines 12 that are configured to form the support structure portions 22s relative to the feed direction 32 of the transfer belt 24. Thus, for example, the EP engine 12b may be positioned upstream from the EP engine 12a, and the EP engine 12d may be positioned upstream of the EP engine 12c relative to the feed direction 32 of the transfer belt 24.

As discussed below, the developed layers 22 are transferred to a transfer medium 24 of the transfer assembly 14, which delivers the layers 22 to the transfusion assembly 20. The transfusion assembly 20 operates to build a 3D structure 26, which includes the 3D part 26p, support structures 26s and/or other features, in a layer-by-layer manner by transfusing the layers 22 together on a build platform 28.

In some embodiments, the transfer medium 24 includes a belt, as shown in FIG. 1. Examples of suitable transfer belts for the transfer medium 24 include those disclosed in Comb et al. (U.S. Publication Nos. 2013/0186549 and 2013/0186558). In some embodiments, the belt 24 includes front surface 24a and rear surface 24b, where front surface 24a faces the EP engines 12, and the rear surface 24b is in contact with the biasing mechanisms 16.

In some embodiments, the transfer assembly 14 includes one or more drive mechanisms that include, for example, a motor 30 and a drive roller 33, or other suitable drive mechanism, and operate to drive the transfer medium or belt 24 in a feed direction 32. In some embodiments, the transfer assembly 14 includes idler rollers 34 that provide support for the belt 24. The exemplary transfer assembly 14 illustrated in FIG. 1 is highly simplified and may take on other configurations. Additionally, the transfer assembly 14 may include additional components that are not shown in order to simplify the illustration, such as, for example, components for maintaining a desired tension in the belt 24, a belt cleaner for removing debris from the surface 24a that receives the layers 22, and other components.

System 10 also includes a controller 36, which represents one or more processors that are configured to execute instructions, which may be stored locally in memory of the system 10 or in memory that is remote to the system 10, to control components of the system 10 to perform one or more functions described herein. In some embodiments, the processors of the controller 36 are components of one or more computer-based systems. In some embodiments, the controller 36 includes one or more control circuits, microprocessor-based engine control systems, one or more programmable hardware components, such as a field programmable gate array (FPGA), and/or digitally-controlled raster imaging processor systems that are used to control components of the system 10 to perform one or more functions described herein. In some embodiments, the controller 36 controls components of the system 10 in a synchronized manner based on printing instructions received from a host computer 38 or from another location, for example.

In some embodiments, the controller 36 communicates over suitable wired or wireless communication links with the components of the system 10. In some embodiments, the controller 36 communicates over a suitable wired or wireless communication link with external devices, such as the host computer 38 or other computers and servers, such as over a network connection (e.g., local area network (LAN) connection), for example.

In some embodiments, the host computer 38 includes one or more computer-based systems that are configured to communicate with the controller 36 to provide the print instructions (and other operating information). For example, the host computer 38 may transfer information to the controller 36 that relates to the sliced layers of the 3D parts and support structures, thereby allowing the system 10 to print the layers 22 and form the 3D part including any support structures in a layer-by-layer manner. As discussed in greater detail below, in some embodiments, the controller 36 also uses signals from one or more sensors to assist in properly registering the printing of the part portion 22p and/or the support structure portion 22s with a previously printed corresponding support structure portion 22s or part portion 22p on the belt 24 to form the individual layers 22.

The components of system 10 may be retained by one or more frame structures. Additionally, the components of system 10 may be retained within an enclosable housing that prevents components of the system 10 from being exposed to ambient light during operation.

Figure 2:
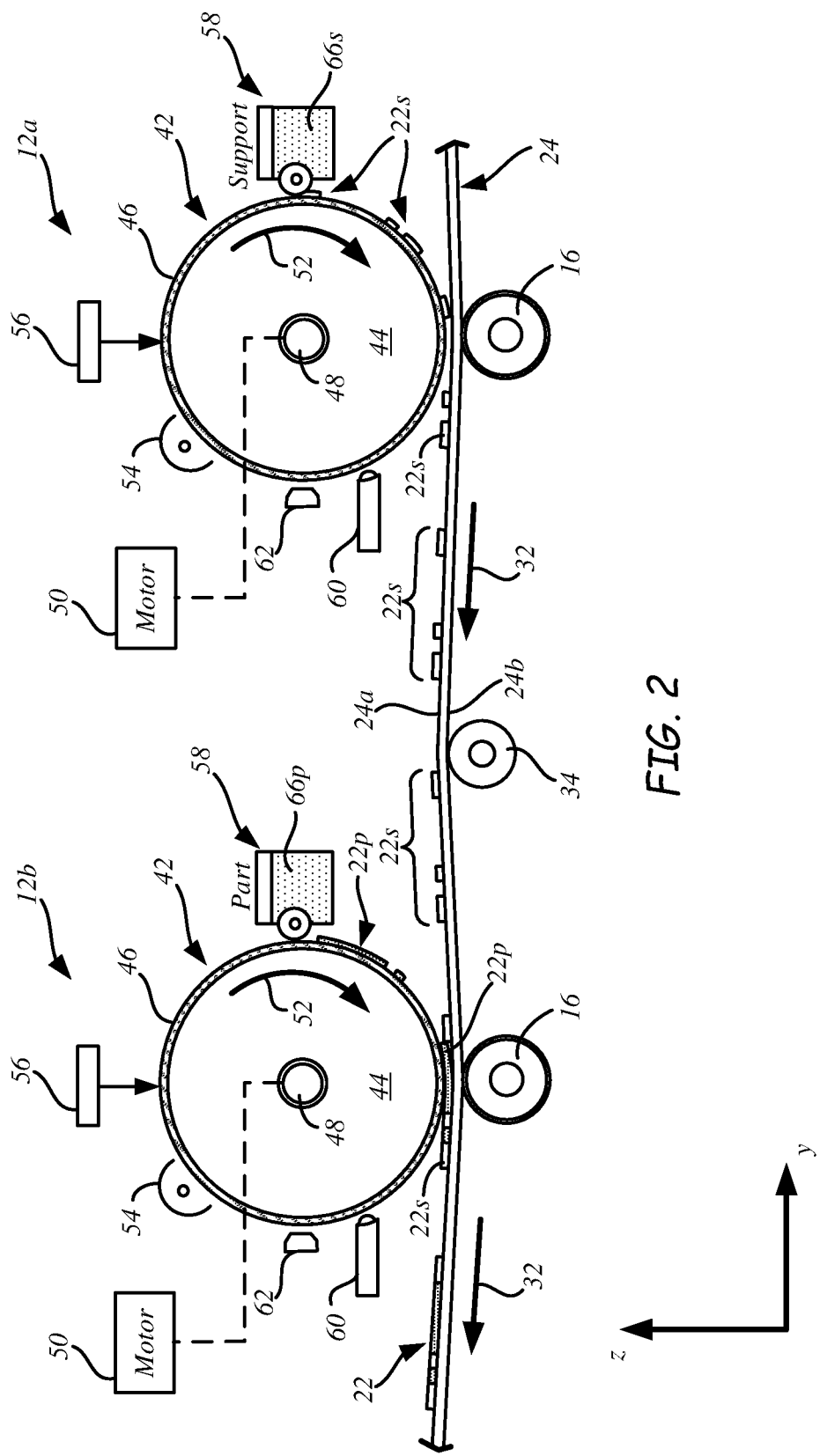
FIG. 2 is a schematic front view of electrophotographic engines, in accordance with exemplary embodiments of the present disclosure.

FIG. 2 is a schematic front view of the EP engines 12a and 12b of the system 10, in accordance with exemplary embodiments of the present disclosure. In the shown embodiment, the EP engines 12a and 12b may include the same components, such as a photoconductor drum 42 having a conductive body 44 and a photoconductive surface 46. The conductive body 44 is an electrically-conductive body (e.g., fabricated from copper, aluminum, tin, or the like), that is electrically grounded and configured to rotate around a shaft 48. The shaft 48 is correspondingly connected to a drive motor 50, which is configured to rotate the shaft 48 (and the photoconductor drum 42) in the direction of arrow 52 at a substantially constant rate. While embodiments of the EP engines 12 are discussed and illustrated as utilizing a photoconductor drum 42, a belt having a conductive material, or other suitable bodies, may also be utilized in place of the photoconductor drum 42 and the conductive body 44.

The photoconductive surface 46 is a thin film extending around the circumferential surface of the conductive body 44 (shown as a drum but can alternatively be a belt or other suitable body), and is preferably derived from one or more photoconductive materials, such as amorphous silicon, selenium, zinc oxide, organic materials, and the like. As discussed below, the surface 46 is configured to receive latent-charged images of the sliced layers of a 3D part or support structure (or negative images), and to attract charged particles of the part or support material to the charged or discharged image areas, thereby creating the layers 22 of the 3D part 26p, or support structure 26s.

As further shown, each of the exemplary EP engines 12a and 12b also includes a charge inducer 54, an imager 56, a development station 58, a cleaning station 60, and a discharge device 62, each of which may be in signal communication with the controller 36. The charge inducer 54, the imager 56, the development station 58, the cleaning station 60, and the discharge device 62 accordingly define an image-forming assembly for the surface 46, while the drive motor 50 and the shaft 48 rotate the photoconductor drum 42 in the direction 52.

The EP engines 12 use the charged particle material (e.g., polymeric or thermoplastic toner), generally referred to herein as 66, to develop or form the layers 22. In some embodiments, the image-forming assembly for the surface 46 of the EP engine 12a is used to form support structure portions 22s of the support material 66s, where a supply of the support material 66s may be retained by the development station 58 (of the EP engine 12a) along with carrier particles. Similarly, the image-forming assembly for the surface 46 of the EP engine 12b is used to form part portions 22p of the part material 66p, where a supply of the part material 66p may be retained by the development station 58 (of the EP engine 12b) along with carrier particles.

The charge inducer 54 is configured to generate a uniform electrostatic charge on the surface 46 as the surface 46 rotates in the direction 52 past the charge inducer 54. Suitable devices for the charge inducer 54 include corotrons, scorotrons, charging rollers, and other electrostatic charging devices.

The imager 56 is a digitally-controlled, pixel-wise light exposure apparatus configured to selectively emit electromagnetic radiation toward the uniform electrostatic charge on the surface 46 as the surface 46 rotates in the direction 52 past the imager 56. The selective exposure of the electromagnetic radiation to the surface 46 is directed by the controller 36, and causes discrete pixel-wise locations of the electrostatic charge to be removed (i.e., discharged), thereby forming latent image charge patterns on the surface 46.

Suitable devices for the imager 56 include scanning laser (e.g., gas or solid state lasers) light sources, light emitting diode (LED) array exposure devices, and other exposure devices conventionally used in 2D electrophotography systems. In alternative embodiments, suitable devices for the charge inducer 54 and the imager 56 include ion-deposition systems configured to selectively directly deposit charged ions or electrons to the surface 46 to form the latent image charge pattern. In accordance with this embodiment, the charge inducer 54 may be eliminated. In some embodiments, the electromagnetic radiation emitted by the imager 56 has an intensity that controls the amount of charge in the latent image charge pattern that is formed on the surface 46. As such, as used herein, the term "electrophotography" can broadly be considered as "electrostatography," or a process that produces a charge pattern on a surface. Alternatives also include such things as ionography.

Each development station 58 is an electrostatic and magnetic development station or cartridge that retains the supply of the part material 66p or the support material 66s, along with carrier particles. The development stations 58 may function in a similar manner to single or dual component development systems and toner cartridges used in 2D electrophotography systems. For example, each development station 58 may include an enclosure for retaining the part material 66p or the support material 66s, and carrier particles. When agitated, the carrier particles generate triboelectric charges to attract the powders of the part material 66p or the support material 66s, which charges the attracted powders to a desired sign and magnitude, as discussed below.

Each development station 58 may also include one or more devices for transferring the charged particles of the support material 66p or 66s to the surface 46, such as conveyors, fur brushes, paddle wheels, rollers, and/or magnetic brushes. For instance, as the surface 46 (containing the latent charged image) rotates from the imager 56 to the development station 58 in the direction 52, the charged part material 66p or the support material 66s is attracted to the appropriately charged regions of the latent image on the surface 46, utilizing either charged area development or discharged area development (depending on the electrophotography mode being utilized). This creates successive layers 22p or 22s on the surface 46 as the photoconductor drum 42 continues to rotate in the direction 52, where the successive layers 22p or 22s correspond to the successive sliced layers of the digital representation of the 3D part or support structure.

In some embodiments, the thickness of the layers 22p or 22s on the surface 46 depends on the charge of the latent image charge pattern on the surface. Thus, the thickness of the layers 22p or 22s may be controlled through the control of the magnitude of the charge in the pattern on the surface using the controller 36. For example, the controller 36 may control the thickness of the layers 22p or 22s by controlling the charge inducer 54, by controlling the intensity of the electromagnetic radiation emitted by the imager 56, or by controlling the duration of exposure of the surface 46 to the electromagnetic radiation emitted by the imager 56, for example.

The successive layers 22p or 22s are then rotated with the surface 46 in the direction 52 to a transfer region in which layers 22p or 22s are successively transferred from the photoconductor drum 42 to the belt 24 or another transfer medium, as discussed below. While illustrated as a direct engagement between the photoconductor drum 42 and the belt 24, in some preferred embodiments, the EP engines 12a and 12b may also include intermediary transfer drums and/or belts, as discussed further below.

After a given layer 22p or 22s is transferred from the photoconductor drum 42 to the belt 24 (or an intermediary transfer drum or belt), the drive motor 50 and the shaft 48 continue to rotate the photoconductor drum 42 in the direction 52 such that the region of the surface 46 that previously held the layer 22p or 22s passes the cleaning station 60. The cleaning station 60 is a station configured to remove any residual, non-transferred portions of part or support material 66p or 66s. Suitable devices for the cleaning station 60 include blade cleaners, brush cleaners, electrostatic cleaners, vacuum-based cleaners, and combinations thereof.

After passing the cleaning station 60, the surface 46 continues to rotate in the direction 52 such that the cleaned regions of the surface 46 pass the discharge device 62 to remove any residual electrostatic charge on the surface 46, prior to starting the next cycle. Suitable devices for the discharge device 62 include optical systems, high-voltage alternating-current corotrons and/or scorotrons, one or more rotating dielectric rollers having conductive cores with applied high-voltage alternating-current, and combinations thereof.

The biasing mechanisms 16 are configured to induce electrical potentials through the belt 24 to electrostatically attract the layers 22s and 22p from the EP engines 12a and 12b to the belt 24. Because the layers 22s and 22p are each only a single layer increment in thickness at this point in the process, electrostatic attraction is suitable for transferring the layers 22s and 22p from the EP engines 12a and 12b to the belt 24. In some embodiments, the thickness of the layers 22p or 22s on the surface 24a of the belt 24 depends on the electrical potential induced through the belt by the corresponding biasing mechanism 16. Thus, the thickness of the layers 22p or 22s may be controlled by the controller 36 through the control of the magnitude of the electrical potential induced through the belt by the biasing mechanisms 16.

The controller 36 preferably controls the rotation of the photoconductor drums 42 of the EP engines 12a and 12b at the same rotational rates that are synchronized with the line speed of the belt 24 and/or with any intermediary transfer drums or belts. This allows the system 10 to develop and transfer the layers 22s and 22p in coordination with each other from separate developer images. In particular, as shown, each part of the layer 22p may be transferred to the belt 24 with proper registration with each support layer 22s to produce a combined part and support material layer, which is generally designated as layer 22. As can be appreciated, some of the layers 22 transferred to the layer transfusion assembly 20 may only include support material 66s, or may only include part material 66p, depending on the particular support structure and 3D part geometries and layer slicing.

In an alternative embodiment, the part portions 22p and the support structure portions 22s may optionally be developed and transferred along the belt 24 separately, such as with alternating layers 22s and 22p. These successive, alternating layers 22s and 22p may then be transferred to the layer transfusion assembly 20, where they may be transfused separately to print or build the structure 26 that includes the 3D part 26p, the support structure 26f, and/or other structures.

Figure 3:
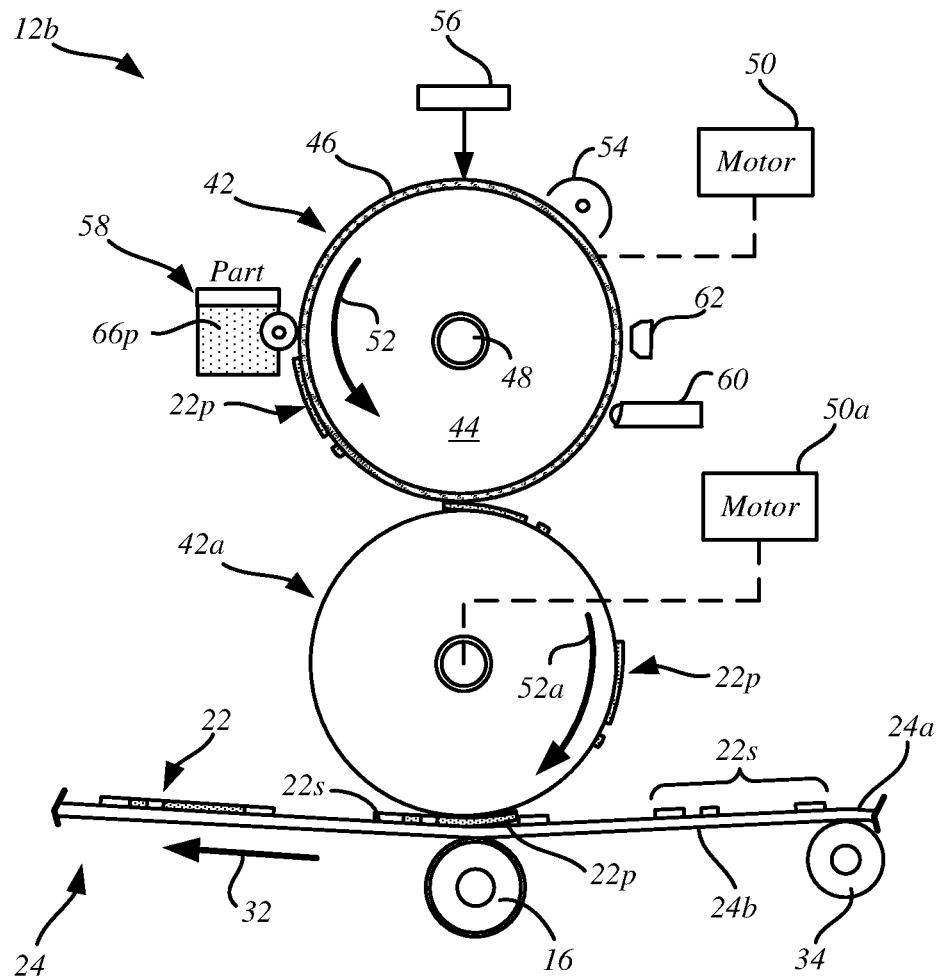
FIG. 3 is a schematic front view of an exemplary electrophotographic engine, which includes a transfer drum or belt, in accordance with exemplary embodiments of the present disclosure.

In a further alternative embodiment, one or both of the EP engines 12a and 12b may also include one or more transfer drums and/or belts between the photoconductor drum 42 and the belt or transfer medium 24. For example, as shown in FIG. 3, the EP engine 12b may also include a transfer drum 42a that rotates in the direction 52a that opposes the direction 52, in which drum 42 is rotated, under the rotational power of motor 50a. The transfer drum 42a engages with the photoconductor drum 42 to receive the developed layers 22p from the photoconductor drum 42, and then carries the received developed layers 22p and transfers them to the belt 24.

The EP engine 12a may include the same arrangement of a transfer drum 42a for carrying the developed layers 22s from the photoconductor drum 42 to the belt 24. The use of such intermediary transfer drums or belts for the EP engines 12a and 12b can be beneficial for thermally isolating the photoconductor drum 42 from the belt 24, if desired.

Figure 4A:
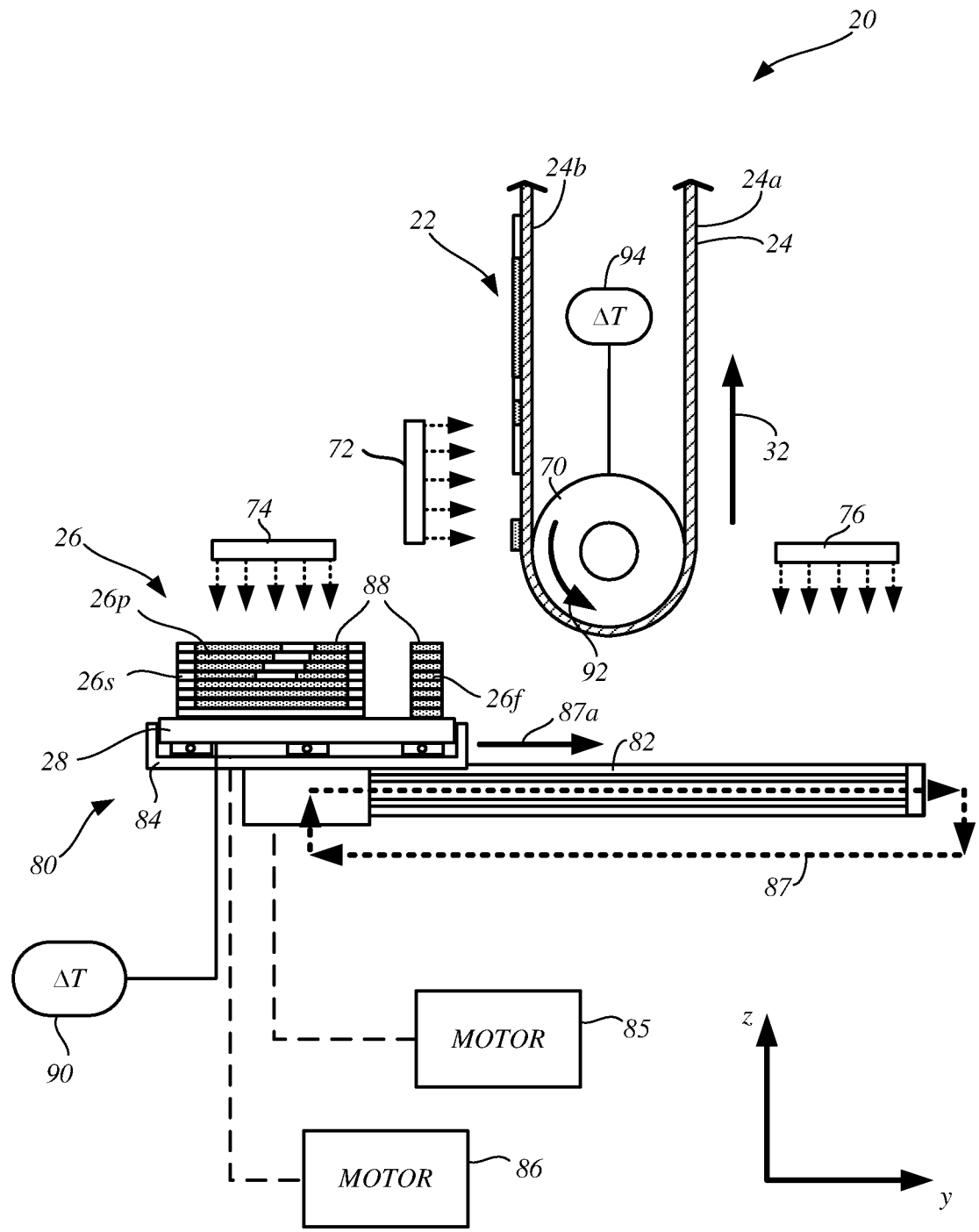
FIG. 4A is a schematic front view of an exemplary transfusion assembly of the system for performing layer transfusion steps with the developed layers without planishing in accordance with exemplary embodiments of the present disclosure.

FIG. 4A illustrates exemplary embodiments of the layer transfusion assembly 20. Embodiments of the transfusion assembly 20 include the build platform 28, a pressing component 70, pre-transfusion heaters 72 and 74, and a post-transfusion cooler 76. The build platform 28 is a platform assembly or platen of system 10 that is configured to receive the heated combined layers 22 (or separate layers 22p and 22s) for printing the structure 26, which includes a 3D part 26p formed of the part portions 22p, and support structure 26s formed of the support structure portions 22s, in a layer-by-layer manner. In some embodiments, the build platform 28 may include removable film substrates (not shown) for receiving the printed layers 22, where the removable film substrates may be restrained against the build platform 28 using any suitable technique (e.g., vacuum, clamping or adhering).

Figure 4B:
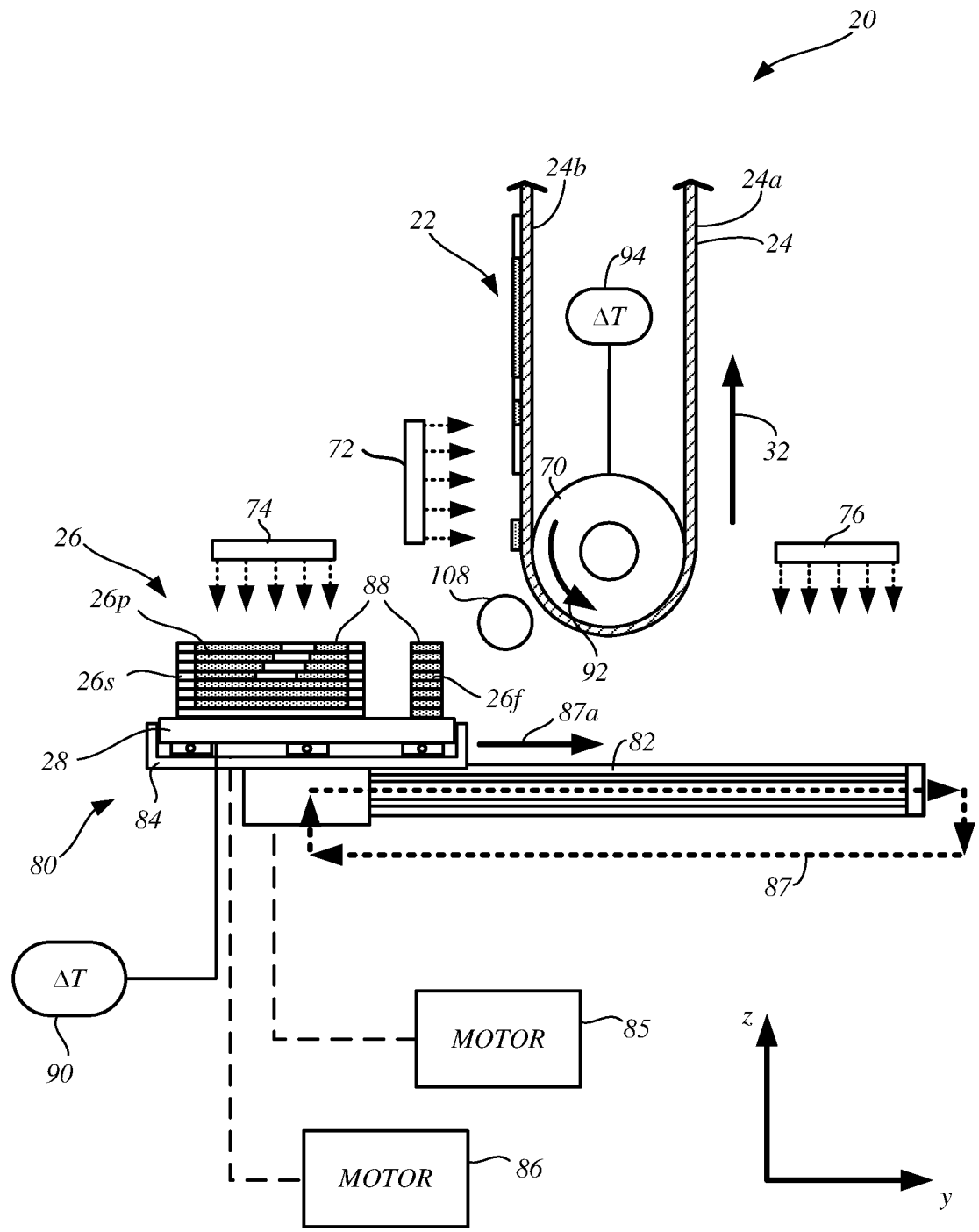
FIG. 4B is a schematic front view of an exemplary transfusion assembly of the system for performing layer transfusion steps with the developed layers with planishing in accordance with exemplary embodiments of the present disclosure.

The build platform 28 is supported by a gantry 80, or other suitable mechanism, which is configured to move the build platform 28 along the z-axis and the y-axis, as illustrated schematically in FIGS. 1, 4A and 4B, and optionally along the x-axis that is orthogonal to the y and z axes. In some embodiments, the gantry 80 includes a y-stage gantry 82 that is configured to move the build platform 28 along at least the y-axis, and an x-stage gantry 84 that is configured to move the build platform 28 along the x-axis. In some embodiments, the y-stage gantry 82 is configured to further move the build platform 28 along the z-axis. Alternatively, the gantry 80 may include a z-stage gantry that is configured to move the build platform along the z-axis. The y-stage gantry 82 may be operated by a motor 85, and the x-stage gantry 84 may be operated by a motor 86, based on commands from the controller 36. The motors 85 and 86 may each be any suitable actuator an electrical motor, a hydraulic system, a pneumatic system, piezoelectric, or the like.

In some embodiments, the y-stage gantry 82 supports the x-stage gantry 84, as illustrated in FIGS. 4A and 4B, or vice versa. In some embodiments, the y-stage gantry 82 is configured to move the build platform 28 and the x-stage gantry 84 along the z-axis and the y-axis. In some embodiments, the y-stage gantry 82 produces a reciprocating rectangular pattern where the primary motion is back-and-forth along the y-axis, as illustrated by broken lines 87 in FIG. 4A. While the reciprocating rectangular pattern is illustrated as a rectangular pattern with sharp axial corners (defined by arrows 87), y-stage gantry 82 may move the build platform 28 in a reciprocating rectangular pattern having rounded or oval corners, so long as the build platform 28 moves along the y-axis process direction (illustrated by arrow 87a) during the pressing steps at the pressing component 70 described below. The controller 36 controls the y-stage gantry 82 to shift the location of a build surface 88, which is the top surface of the printed structure 26, along the y-axis and position the layers 22 in proper registration with the build surface 88 along the y-axis during the transfusion operation.

The x-stage gantry 84 is configured to move the build platform 28 along the x-axis relative to the y-stage gantry 82, thereby moving the build platform 28 and the printed structure 26 in perpendicular or lateral directions relative to the y-axis process direction of arrow 87a. The x-stage gantry 84 allows the controller 36 to shift the location of the build surface 88 of the structure 26 along the x-axis to position the layers 22 in proper registration with the build surface 88 along the x-axis during the transfusion operation.

In some embodiments, the build platform 28 is heated using a heating element 90 (e.g., an electric heater). The heating element 90 is configured to heat and maintain the build platform 28 at an elevated temperature that is greater than room temperature (25° C.), such as at a desired average part temperature of 3D part 26p and/or support structure 26s, as discussed in Comb et al., U.S. Publication Nos. 2013/0186549 and 2013/0186558. This allows the build platform 28 to assist in maintaining 3D part 26p and/or support structure 26s at this average part temperature. However, it must be noted that heating of build platform 28 is not required in all embodiments.

In some embodiments, the pressing component 70 is configured to press the layers 22 from the belt to the build surface 88 of the structure 26 to transfuse the layers 22 to the build surface 88. In some embodiments, the pressing component 70 is configured to press each of the developed layers 22 on the belt 24 or other transfer medium into contact with the build surfaces 88 of the structure 26 on the build platform 28 for a dwell time to form the 3D structure 26 in a layer-by-layer manner.

The pressing component 70 may take on any suitable form. In some exemplary embodiments, the pressing component 70 is in the form of a nip roller, as shown in FIG. 4A. The pressing component 70 includes a pressing plate, such as discussed in Comb et al., in U.S. Pub. Nos. 2013/0186549 and 2013/0075033, which are each incorporated by reference in their entirety. In some exemplary embodiments, the pressing component 70 includes the support of the belt 24 between pairs of rollers, such as discussed in Comb et al., in U.S. Pub. Nos. 2013/0186549 and 2013/0075033. The pressing component 70 may also take on other suitable forms. Thus, while embodiments will be described below using the nip roller embodiment of the pressing component 70, it is understood that embodiments of the present disclosure include the replacement of the nip roller with another suitable pressing component 70.

FIG. 4B illustrates an embodiment of a system 20 using a planishing roller 108. Planishing rollers such as roller 108 serve to compact a layer to reduce voids, potentially to heat a layer to remove at least some moisture and solvents, and/or to create films that support tensile loading. A roller 108 presses the layer 22 between itself and the pressing component 70 in this embodiment, but a separate planishing roller 108 and second roller could be used apart from the pressing component without departing from the scope of the disclosure. While a planishing roller can be used to reduce voids or pores, below described embodiments utilize methods of rapidly heating the top part layers at build surface 88 to fully consolidate each layer at the time of transfer onto the build surface, and planishing therefore may not be required or provide sufficient additional benefit in some embodiments.

In some embodiments, the nip roller 70 is configured to rotate around a fixed axis with the movement of the belt 24. In particular, the nip roller 70 may roll against the rear surface 24b in the direction of arrow 92, while the belt 24 rotates in the feed direction 32.

In some embodiments, the pressing component 70 includes a heating element 94 (e.g., an electric heater) that is configured to maintain the pressing component 70 at an elevated temperature that is greater than room temperature (25° C.), such as at a desired transfer temperature for the layers 22.

In some embodiments, the pre-transfusion heater 72 includes one or more heating devices (e.g., an infrared heater and/or a heated air jet) that are configured to heat the layers 22 on the belt 24 to a temperature near an intended transfer temperature of the layer 22, such as at least a fusion temperature of the part material 66p and the support material 66s, prior to reaching nip roller 70. Each layer 22 desirably passes by (or through) the heater 72 for a sufficient residence time to heat the layer 22 to a temperature that is typically below a temperature required to transfuse the layer onto the previously printed layers. In other embodiments, layers 22 are either not heated, or are heated but to a temperature lower than the fusion temperature of the part material and then are pressed into a part build surface which has been rapidly heated to a temperature in a range between the flowable temperature and a thermal oxidation threshold temperature for the part material, such that the heated temperature is at or above the flowable temperature and below the thermal oxidation threshold. If layers 22 are not heated, heater 72 can be optionally omitted in some embodiments.

When the part material and/or support material is an amorphous polymer, the polymer does not have a melting point, but rather becomes flowable or molten as the temperature rises. In contrast, a semi-crystalline material has a melting point where the semi-crystalline material becomes flowable. While the present disclosure references amorphous polymers, it is understood that the present disclosure can be utilized with semi-crystalline materials.

The pre-transfusion heater 74 is typically a non-contact heater that heats the top surfaces of the 3D part 26p and support structure 26s on the build platform 28 to an elevated temperature. This elevated temperature is a temperature that is higher than a temperature of a layer 22 to be transfused onto the part 26 and the temperature of the belt 24. Further, in some embodiments described further below, pre-transfusion heater 74 is configured to rapidly heat the top surfaces of the 3D part 26p and support structure 26s to at least the melt temperature of the part material, but below the thermal oxidation threshold.

In some embodiments, the support material 66s, which is used to form the support structure portions 22s and the support structure 26s, preferably has a melt rheology that is similar to or substantially the same as the melt rheology of the part material 66p that is used to form the part portions 22p and the 3D part 26p. This allows the part and support materials 66p and 66s of the layers 22p and 22s to be heated together with the heater 72 to, for example, substantially the same transfer temperature. Thus, the part portions 22p and the support structure portions 22s may be transfused together to the top surfaces of the 3D part 26p and the support structure 26s in a single transfusion step as the combined layer 22 where heat in the top layers of part 26p and support structure 26s is rapidly diffused into the cooler layers 22 to heat the layers 22 to a temperature which results in the transfusion of the layers 22 to the part 26, and consolidation of the transferred layer to eliminate pores or voids.

Post-transfusion cooler 76 is located downstream from nip roller 70 relative to the direction 87a in which the build platform 28 is moved along the y-axis by the y-stage gantry 82, and is configured to cool the transfused layers 22. The post-transfusion cooler 76 removes sufficient amount of heat to maintain the printed structure at a thermally stable average part temperature such that the part being printed does not deform due to heating or processing conditions during the transfusion process. The post-transfusion cooler 76 removes substantially all of the heat imparted into the 3D part with transfused layer to maintain the 3D part being printed at a thermally stable average bulk part temperature. In exemplary embodiments described below, while heater 74 is configure to rapidly heat the build surface immediately prior to the transfer of a layer 22 from belt 24, cooler 76 quickly removes the heat energy from the part 26 to prevent degradation of the part material.

As mentioned above, in some embodiments, prior to building the structure 26 on the build platform 28, the build platform 28 and the nip roller 70 may be heated to desired temperatures. For example, the build platform 28 may be heated to the average part temperature of 3D part 26p and support structure 26s (due to the close melt rheologies of the part and support materials). In comparison, the nip roller 70 may be heated to a desired transfer temperature for the layers 22 (also due to the close melt rheologies of the part and support materials).

During the printing or transferring operation, the belt 24 carries a layer 22 past the heater 72, which may heat the layer 22 and the associated region of the belt 24 to the transfer temperature. Suitable transfer temperatures for the part and support materials 66p and 66s of the present disclosure include temperatures that exceed the glass transition temperature of the part and support materials 66p and 66s, where the layer 22 is softened but not flowable.

As further shown in FIG. 4A, during operation, the y-stage gantry 82, or a combination of the y-stage gantry 82 and a z-stage gantry, may move the build platform 28 (with 3D part 26p and support structure 26s) in a reciprocating rectangular pattern 87. For example, as the y-stage gantry 82 moves the build platform 28 along the y-axis in the direction 87a below, along, or through the heater 74, the heater 74 rapidly heats the build surfaces 88 of the 3D part 26p and support structure 26s to an elevated temperature, such as at or above a flowable temperature of the part and support materials which is above the temperature of layer 22 to be transferred but below a thermal oxidation temperature of the material. In these embodiments in which heater 74 heats the surface of the part 26 to a temperature in excess of the temperature of layer 22, the part surface functions to rapidly diffuse heat into the layer 22 that is to be transfused. Further examples of such embodiments are described below in greater detail.

Figure 5:
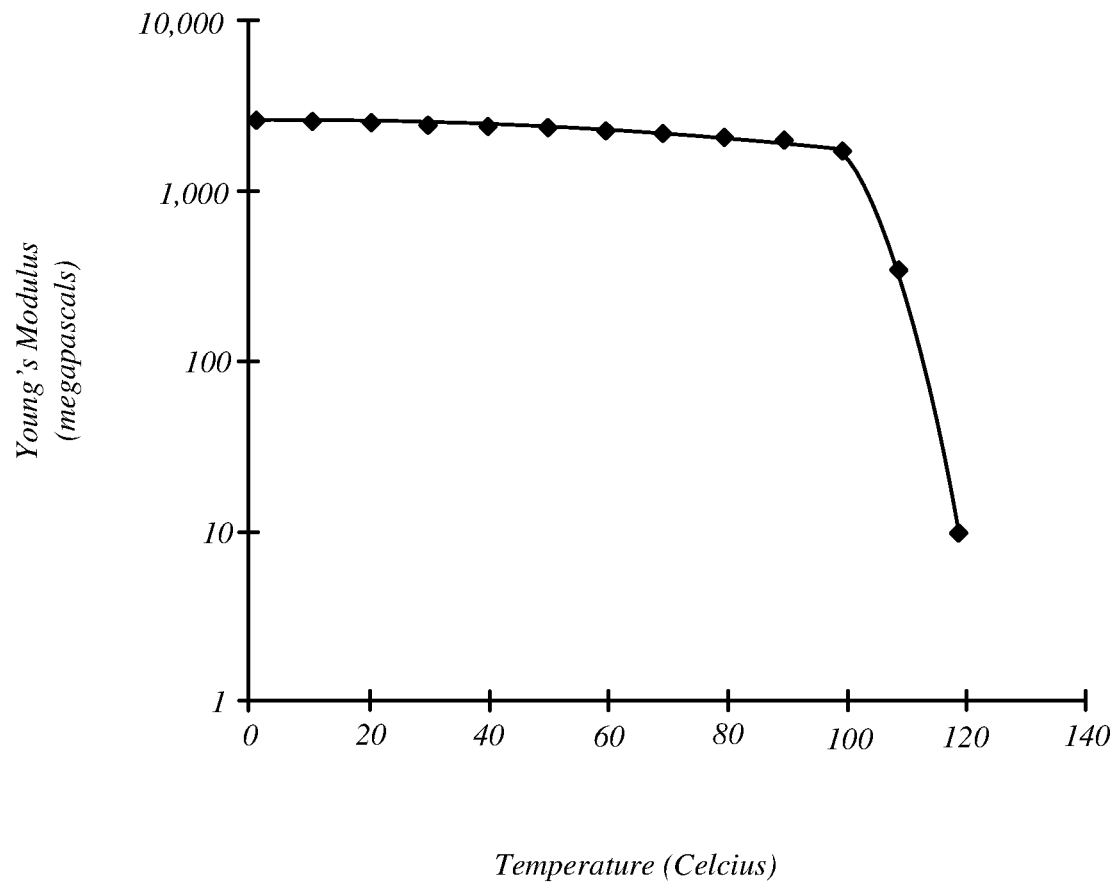
FIG. 5 is a logarithmic graphical illustration of Young's modulus versus temperature at atmospheric pressure for an acrylonitrile-butadiene-styrene (ABS) copolymer.

The heating of the part surface to at least the flowable temperature of the material enables a rapid heat transfer from the part surface to the layer to be transfused to aid in fully consolidating the layer as it is transferred. The layer 22 is transfused by pressing the press component 70 against the belt 24 to sandwich the layer 22 between the belt 24 and the part 26. The higher temperature of the part 26 enables heat diffusion from the part surface into the layer 22. This, combined with the pressing of press component 70, transfuses the layer 22 to the part 26 and fully consolidates the layer, eliminating voids. A cooler 76 is used to rapidly cool the part surface to remove the heat energy added immediately prior to transfusion. For example, the cooler 76 can cool the part surface to a temperature sufficiently cool that it is substantially non-flowing, in one embodiment below a temperature at which the at the Young's Modulus sharply declines, as shown in FIG. 5 for ABS material. The tackiness of the layer 22 and pressure from the transfusion process, combined with the surface of the part 26 being heated to a flowable temperature in excess of the layer temperature, allows the heat to rapidly diffuse to the layer 22 from the top few layers of part 26 to assist in transfusion from the belt to the part being printed.

The upper range of temperature to which heater 74 heats the top layers of the build surface, which will not result in degradation of the build material, can be determined by the time and temperature dependent thermal-degradation kinetics threshold (TDKT). The TDKT is a time-temperature parameter that defines a rate of thermal degradation of a polymeric material, such as by depolymerization, backbone chain scission, pendant-group stripping, polymer cross linking, and/or oxidation processes. The thermal degradation of a material can reduce the desired physical properties of the material, such as changing the glass transition temperature, dissolution characteristics, physical appearance, adhesive properties, and the like. These effects can cause defects in the part being printed.

The TDKT reaction rate typically follows the first-order Arrhenius equation, which is substantially linear with time and exponential with temperature. As an example, for a material exposed to a selected elevated temperature for a selected duration, increasing the exposure temperature by a small amount (e.g., about 10° C.) or reducing the exposure duration by about 50% (e.g., doubling the flow rate) may net about the same thermal reaction rates on the support material, although the particular net thermal effects may vary depending on the support material composition.

It should be understood that the example temperatures discussed herein are for ABS materials. However, the use of other materials will use different temperatures without departing from the scope of the disclosure.

In general, the continued rotation of the belt 24 and the movement of the build platform 28 align the layer 22 with the rapidly heated build surfaces 88 of 3D part 26p and support structure 26s along the y-axis. The y-stage gantry 82 may move the build platform 28 along the y-axis at a rate that is synchronized with the rotational rate of the belt 24 in the feed direction 32 (i.e., the same directions and speed). This causes the rear surface 24b of the belt 24 to rotate around the nip roller 70 to nip the belt 24 and the layer 22 against the build surfaces 88 of the 3D part 26p and/or the support structure 26s at a pressing location or nip of the nip roller 70. This pressing of the layer 22 against the heated build surfaces 88 of the 3D part 26p and/or the support structure 26s at the location of the nip roller 70, allows heat transfer from the build surface into the layer 22, which transfuses a portion of the layer 22 below the nip roller 70 to the corresponding build surfaces 88 while fully consolidating the layer 22 to the build surface.

In some embodiments, a pressure that is applied to the layer 22 between the belt 24 and the build surfaces 88 of the 3D structure 26 during this pressing stage of the transfusion process is controlled by the controller 36 through the control of a pressing component roller bias mechanism. The pressing component bias mechanism controls a position of the build surfaces 88 relative to the nip roller 70 or belt 24 along the z-axis. For instance, when the pressing component 70 is in the form of the nip roller, as the separation between the build surfaces 88 and the nip roller 70 or belt 24 is decreased along the z-axis, the pressure applied to the layer 22 increases, and as the separation between the build surfaces 88 and the nip roller 70 or belt 24 is increased along the z-axis, the pressure applied to the layer 22 decreases. In some embodiments, the pressing component bias mechanism includes the gantry 80 (e.g., z-stage gantry), which controls a position of the build platform 28 and the build surfaces 88 along the z-axis relative to the pressing component 70 and the belt 24. In exemplary embodiments described further below, the heater 74 operates to rapidly heat only the top-most layers of 3D part 26p and support structure 26s.

After rapid cooling using cooler 76 to remove the heat energy from the build surface and the most recent transferred layer, the y-stage gantry 82 may then actuate the build platform 28 downward, and move the build platform 28 back along the y-axis to a starting position along the y-axis, following the reciprocating rectangular pattern 87. The build platform 28 desirably reaches the starting position, and the build surfaces 88 are properly registered with the next layer 22 using the gantry 80. The same process may then be repeated for each remaining layer 22 of 3D part 26p and support structure 26s.

After the part structure 26 is completed on the build platform 28, the structure 26 may be removed from the system 10 and undergo one or more operations to reveal the completed 3D part 26p. For example, the support structure 26s may be sacrificially removed from the 3D part 26p using an aqueous-based solution such as an aqueous alkali solution. Under this technique, the support structure 26s may at least partially dissolve or disintegrate in the solution separating the support structure 26s from the 3D part structure 26p in a hands-free manner. In comparison, the part 26p is chemically resistant to aqueous solutions including alkali solutions. This allows the use of an aqueous alkali solution for removing the sacrificial support 26s without degrading the shape or quality of the 3D part 26p. Furthermore, after the support structure 26s is removed, the 3D part 26p may undergo one or more additional processes, such as surface treatment processes.

Figure 6:
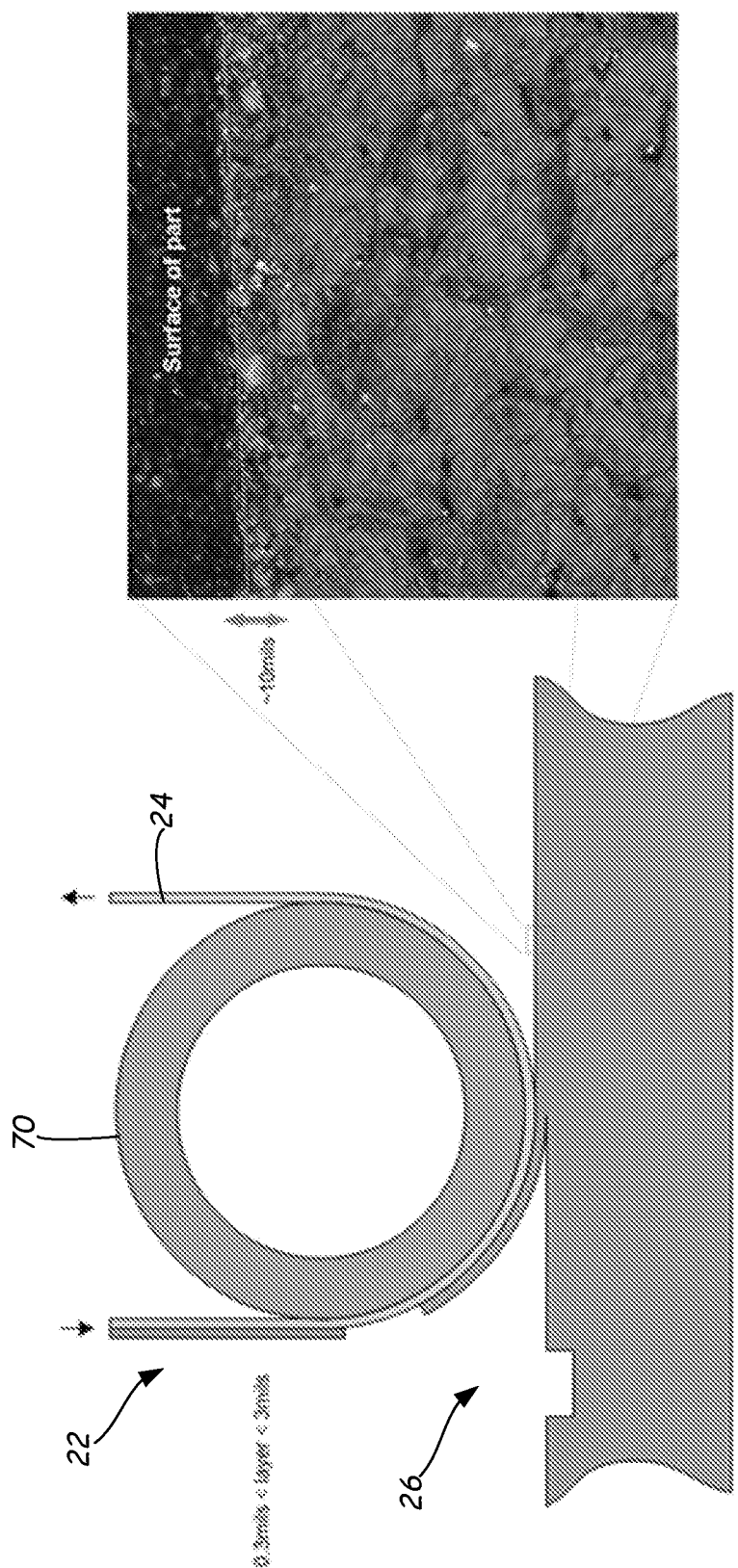
FIG. 6 is a diagrammatic front view of a transfusion assembly pressing developed layers onto a part build surface and showing a porous layer structure.
Figure 7:
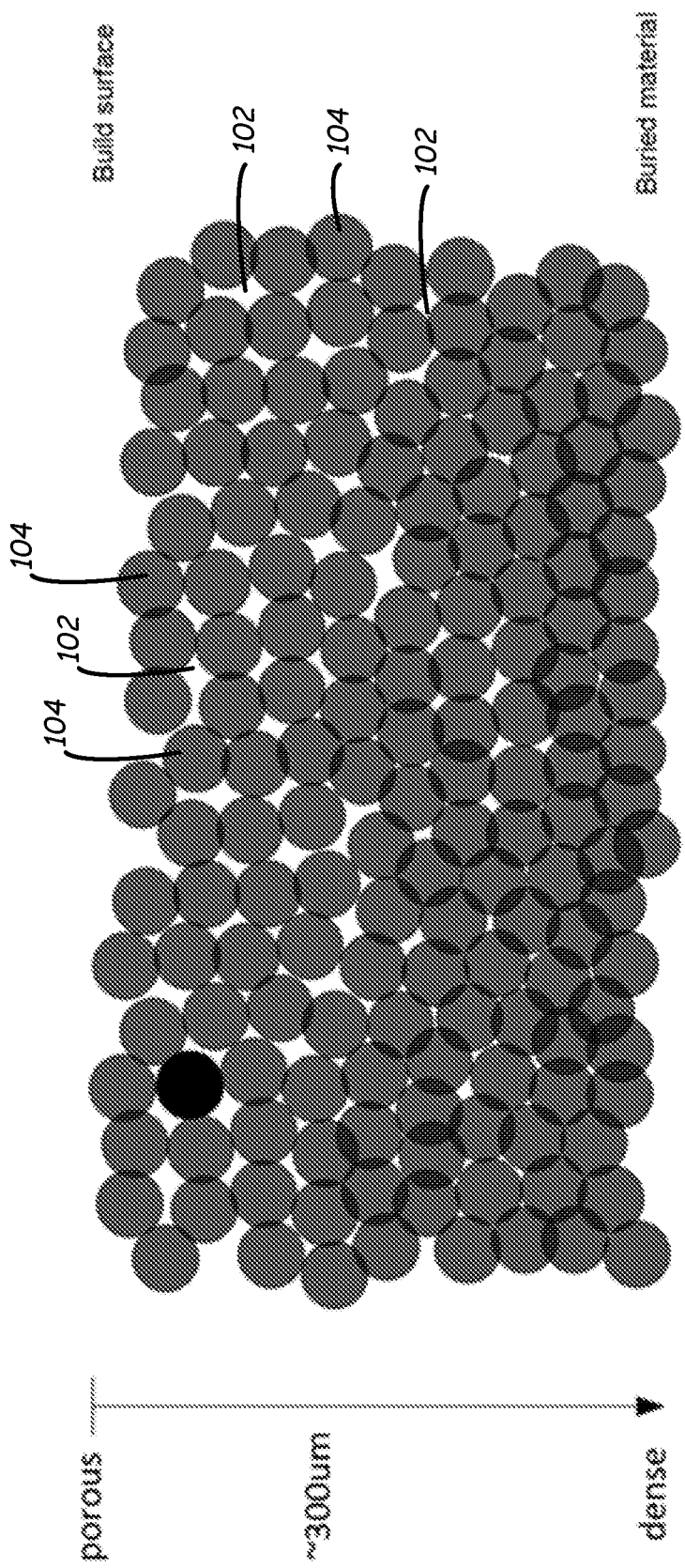
FIG. 7 is a diagrammatic side view of layers of a part showing a structure with pores or voids formed between particles, and showing decreased porosity at increasing layer depth.

As discussed above, in some EP processes, fusion of the layers might be termed a sedimentary process. FIG. 6 illustrates an example of a part 26 build with a layer being transferred. Fracturing the part under construction in the X-Z plane shows that, in some processes, the part is porous at the most recently transferred layer, becoming fully fused some 10 to 20 layers into the part. Such decreasing porosity (increasing density) with increasing layer depth is shown diagrammatically in FIG. 7 with pores 102 formed between particles 104 or groups of particles in the layers. By way of example, the target alpha layer time for some exemplary EP processes is $\tau_{layer}$=5.2 seconds. The thermal wavelength associated with this period is $\lambda_{layer}=\sqrt{\kappa\tau_{layer}/\pi}$=17 mils, or roughly 20 toner monolayers.

Porous surface layers can be problematic. For instance, the thermal properties of porous surface layers can make it more difficult to heat and cool. The pores make the thermal paths through the polymer tortuous, and the many air-polymer interfaces have impedance mismatches for photon (heat) transfer. Further, some of the embedded pores can become closed cells. These closed cells become particularly hard to eliminate, as the trapped gas has to be dissolved into the polymer. The part surfaces tend to be porous unless they are intimately compressed by several layers of support material.

In a typical scenario, the thermal wavelength and polymeric thermal diffusivity constrains the layer build time to about 5 seconds, which in some electrophotography systems is approximately 12 layers per minute equivalent. This is slower than optimal for electrophotography. The long thermal wavelength is better suited to thicker layers (3 mils and greater) than electrophotography can readily print. Further, porous surface layers can result in a fracture strength which is significantly lower than equivalent injection molded parts of the same polymer, suggesting that polymeric inter-diffusion across the interfaces between consolidated toner particles is not complete.

The strength of the bond between similar regions of polymer across an interface can be gaged by the inter-diffusion distance across the interface. This distance is proportional to $$\sqrt[4]{t/\tau_d},$$

where $\tau_d$ is the reptation time (dependent on temperature, pressure, molecular weight, and molecular configuration) for times short compared to $\tau_d$. Reptation times have an Arrhenius exponential temperature dependence:

$$\tau_d = A\exp\left[\frac{E_a}{RT}\right] \qquad \text{Equation 1}$$

where A is a factor related to polymer chemistry and architecture, $E_a$ is an activation energy, R is the ideal gas constant 8.314 joule/(mole degK), and T is the absolute temperature. Reptation times can also be identified using loss modulus rheology plots at the low frequency peak.

The interfacial diffusion distance has reached half of its terminal value when t=$\tau_d$/16. An analysis of obtaining strength by optimizing reptation time of the interfaces suggests that: (1) Waiting for interfacial diffusion to strengthen the bond of a new layer beyond $\tau$=d/16 is an inefficient use of time, due to the fourth root dependence on $\tau_d$. The exponential dependence of $\tau_d$ on temperature shows that bonding should be performed at the highest temperatures not causing degradation. Therefore, disclosed embodiments are based, in part, upon the recognition that the formation of stronger parts can be achieved by first forming the polymer-polymer interface quickly, and secondly to make that interface as hot as possible without causing degradation.

Figure 8A:
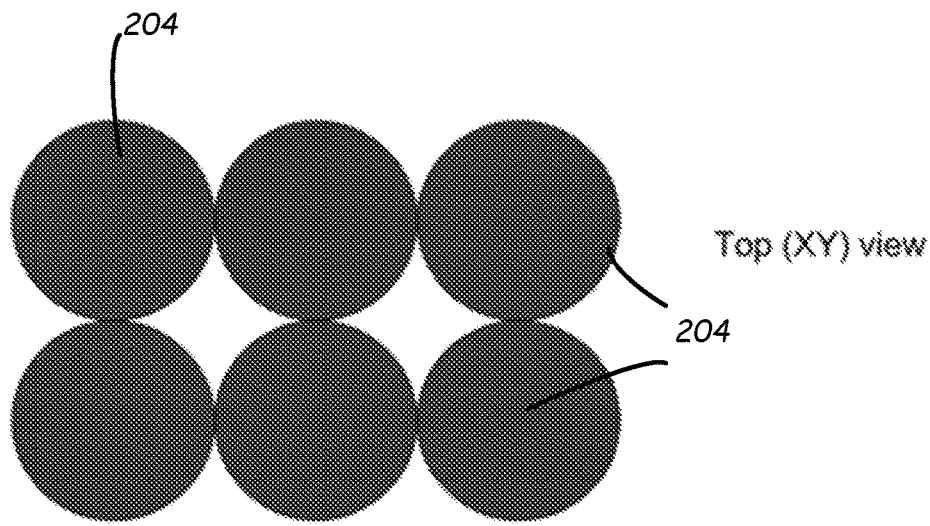
FIGS. 8A-8C are top and side views showing a monolayer of toner particles on a flowable build surface to demonstrate aspects of the present disclosure.
Figure 8B:
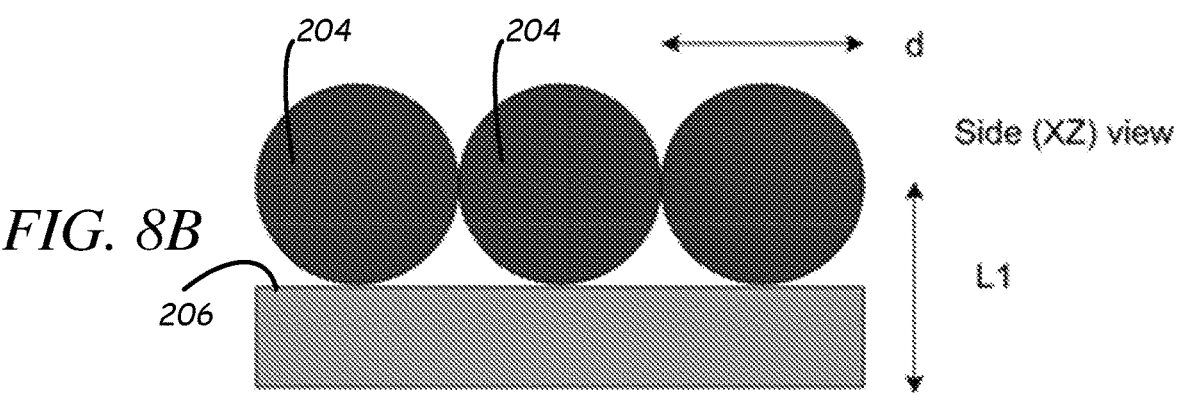
Figure 8C:
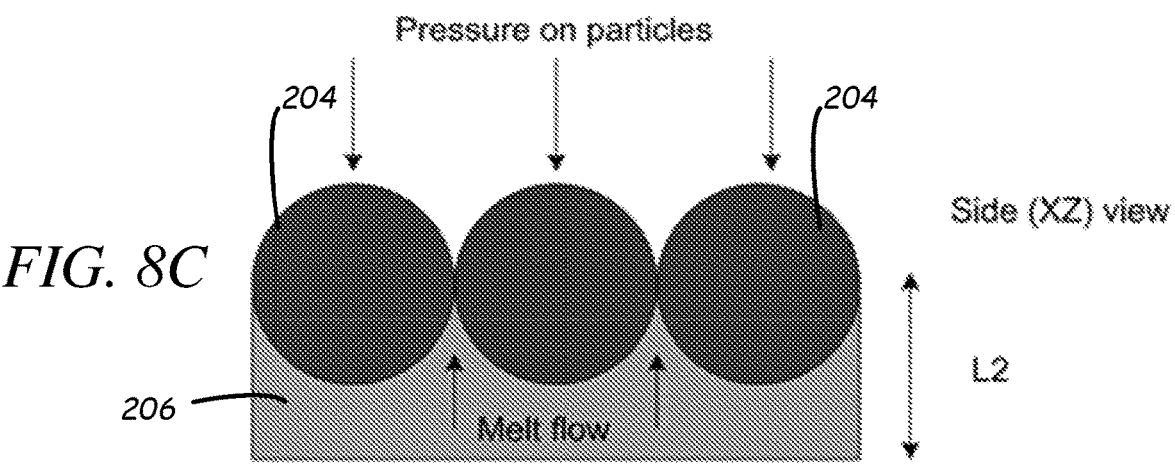

Disclosed embodiments are based partially upon this recognition of the importance of efficiently eliminating pores in and between layers of a 3D part during a build process using an electrophotographic based additive manufacturing system. In embodiments which transfer fully planished images, this is of less concern as fully planished images can be transferred to the part build surface without capturing voids or pores. To analyze the consolidation of a transferred layer onto the top layer(s) of a build surface, consider an example of a rectangular close-packed monolayer of toner spheres 204 pressed into a flowable planar surface 206 as shown initially in the top and side views of FIGS. 8A and 8B. In this example, the toner spheres 204 have a diameter d, and are pressed into the flowable planar surface 206 with a viscosity η, flowing the polymer up to the equators of the spheres as show in FIG. 8C.

To determine how much time and force are required for the toner spheres to be pressed into the flowable surface, motion of the spherical particles and the void between adjacent particles with displacement of the flowable material are considered. It is assumed that the motion of the surface up displaces the same volume as a half-cube minus a half-sphere, $$L1 - L2 = \frac{d}{2}\left(1 - \frac{\pi}{6}\right),$$

the size of the void is about d ($\sqrt{2}-1$), and the flow of molten material is about $$\frac{d^3}{2}\left(1-\frac{\pi}{6}\right).$$

Combining these relationships into Hagen-Poiseuille pipe flow, which provides an estimated solution, the required hydrostatic pressure times the pressing time is 78 η, which is particle size independent. For a 'typical' viscosity of 300 poise, and a pressing time of 20 milliseconds, the required pressure is 17 psi. This suggests that a monolayer of toner particles can be pressed into sufficient contact with the flowable polymeric material on the surface of the part in a time and pressure both substantially less than those found in a typical EP processes using a nip roller.

Once pressed into the flowable surface, toner particles quickly come up to temperature. The thermal diffusivity of material offered under the trade designations MG94 and SR30, by Stratasys, Inc. located in Eden Prairie, Minnesota, are roughly κ=160 mil²/s at fusion temperatures. Exemplary toner particles used in EP build processes are about s=0.2 mils=21 microns in diameter. The thermal diffusion time associated with one particle diameter is 0.822/160=4.2 milliseconds.

Figure 9:
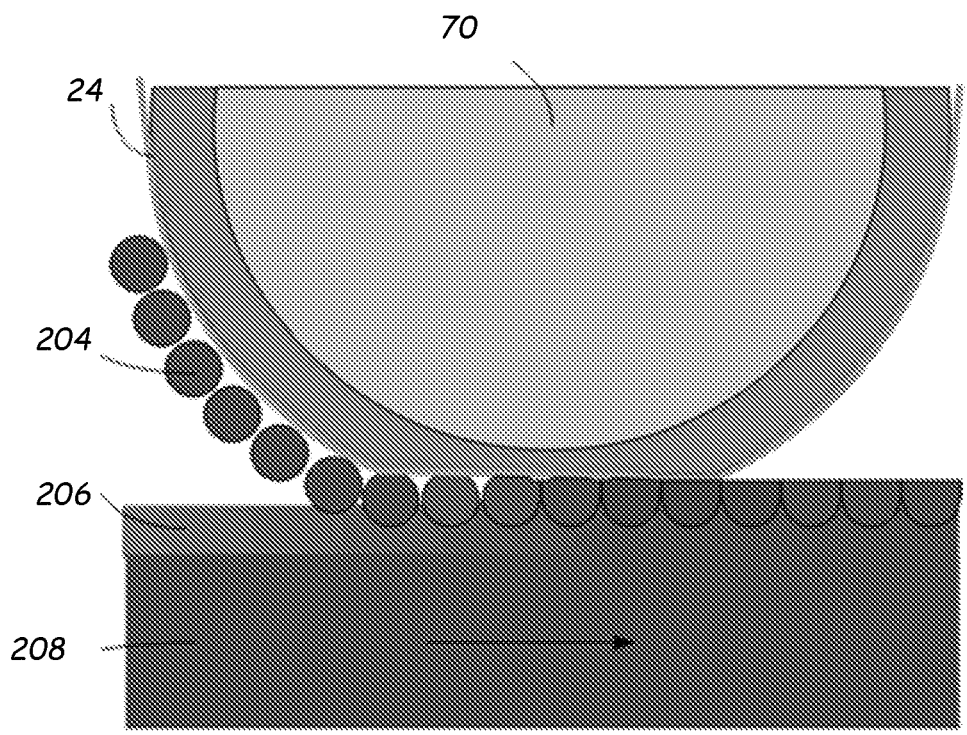
FIG. 9 is a diagrammatic front view of a transfusion assembly pressing a developed layer of an image onto a flowable part build surface to achieve complete consolidation.

Once in a flowable state, the new toner particles 204 are flattened into a film as they flow and are cast against the transfer belt 24, leaving a consolidated part surface with significantly less, if any, pores. This flattening process is depicted in FIG. 9, where lower temperature ("cold") toner particles 204 are pressed by the pressing component 70 (e.g. in the form of a nip roller) and the transfer belt 24 into one or more higher temperature flowable layers 206 at the build surface of the part. Below the flowable layers 206, the part can remain at a lower temperature. Another advantage of pressing a monolayer of toner into a flowable top layer is that gas that evolves from heating the toner particles (such as water vapor) is more inclined to reside at the toner-belt interface than in trapped voids in the part.

Thus, in disclosed embodiments, instead of using a sedimentary process where gradual consolidation of a layer of part material occurs as an increasing number of subsequent layers are applied, a layer of part material can instead be fully consolidated as it is applied by pressing the layer into a rapidly heated part surface, and then the subsequently cooled. Using disclosed methods, the materials rapidly inter-diffuse across the interface, then the combination is cooled. In this process, less heat is required, because the thermal diffusion distance is shallower.

In exemplary embodiments, such as those discussed above with reference to FIGS. 4A and 4B, a flux of D joules/cm² of heat energy is transmitted into the top few mils of the part build surface (e.g., build surface 88) to achieve a short reptation time, corresponding to a temperature of 350° C. for ABS by way of non-limiting example. A half-space with a planar interface at Z=0 (the part is the half-space, the part build surface is the plane) is initially at the bulk temperature $T_{bulk}$. The part material has density ρ, heat capacity Cp, and thermal diffusivity κ. As long as that flux is being applied, the surface temperature rises as $$T(z,t) = T_{bulk} + \frac{D}{\rho Cp\sqrt{\kappa\pi t}}\exp\left(\frac{-z^2}{4\kappa t}\right) \quad \text{Equation 2}$$

Assume for analysis purposes that the consolidated image thickness is s, and that in this "sheet welding" process, it is desired to constrain the heating depth to $n_{layers}$ s, where $1 \le n_{layers} \le 10$. The heated layer thickness is referred to as that z depth where the temperature rise is ψ of the maximum rise (e.g., 0.8 has been found to be a good choice for ψ). The total time that the surface heat can be allowed to diffuse comes from the exponential:

$$\tau_{heat} = \frac{(n_{layers}s)^2}{4\kappa\ln(1/\psi)} \quad \text{Equation 3}$$

For s=0.75 mil, $n_{layers}$=8, κ=180 mil²/s, and =0.8, $\tau_{heat}$=240 msec.

The heat energy flux required (assuming heating of the part build surface occurs right up to the nip roller entrance where the transfer belt presses the next image layer onto the build surface) to get a surface temperature of $\tau_{peak}$ is:

$$D = (T_{peak} - T_{bulk})K\sqrt{\pi\tau_{heat}/\kappa} \quad \text{Equation 4}$$

$$D = (T_{peak} - T_{bulk})\frac{Kn_{layers}s}{2\kappa}\sqrt{\pi/\ln(1/\psi)} \quad \text{Equation 5}$$

Where K is the thermal conductivity of the polymer. For K=0.18 watts/(m degC.), $T_{peak}$=350 degC., $\tau_{bulk}$=100 degC., and $\tau_{heat}$=0.24s, it is found the required flux is D=11.5 joule/cm².

The heat flux absorbed by the surface is:

$$W = \frac{D}{\tau_{heat}} = (T_{peak} - T_{bulk})\frac{2K}{n_{layers}s}\sqrt{\pi\ln(1/\psi)} \quad \text{Equation 6}$$

The heat flux absorbed is 48 watts/cm² using the example values above.

Note that the required heat energy flux is linearly dependent upon the thickness of the heated surface layer of build surface 88, and the power is inversely proportional to the thickness. Note also that the transfer belt speed does not appear in the heater dose or flux calculation, other than the requirement that $v_{belt}=Lx_{heater}/\tau_{heat}$.

It has been found that heating the top eight 0.75 mil layers of a build surface requires a similar flux of heat energy from heater 74 as used to heat the build surface in some sedimentary EP processes, but in disclosed embodiments the heat flux is approximately twice as intense. Infrared lamp style heaters can therefore be used for heater 74 in some embodiments of the disclosed "sheet welding" type EP processes. However, the requirement for the heat flux to be rapidly applied can require other types of heaters in some embodiments. For example, filament bulbs are available that emit 200 watts per inch on half inch centers. If 75% of that power was absorbed by the build surface, the flux would be 46 watts/cm². In an example where it is assumed that bulbs are positioned every 0.25" until adjacent to the nip roller 70, the number of bulbs required is $v_{belt}/(2$ ips) (or 6 bulbs for a 12 ips belt). Thus, in this example, 24 ips transfusing could be implemented with an intense 12 bulb array next to the transfuse roller. This alternate heater type of heater 74 is provided as an example for discussion purposes, and it must be understood that different numbers of bulbs, emitted wattage of bulbs, and configuration of bulbs can be used for particular systems, build materials, etc.

Further, still other types of heaters can be used for heater 74 in order to rapidly heat the build surface. For example, lasers or laser arrays can be used to provide heater 74 to heat the build surface. In one example, Vertical Cavity Surface-Emitting Laser (VCSEL) arrays can deposit 100 watts/cm$^2$. This reduces the required flux to 5.5 joule/cm$^2$. Other types of lasers or laser arrays can also be used to provide heater 74. Further, the required cooling by cooling device 76 is reduced by more than a factor of two, since the heat is nearer the surface when using a laser type of heater.

The required contact width of the pressing component 70 (e.g., the nip roller width) and corresponding pressing or dwell time are determined by the particle heating time, the flow time, and the particle flattening time. In one example, if 17 psi from the provided by the pressing component 70, the new layer of toner particles could be expected to be pressed into the flowable surface in 20 msec. If 4 msec were required to heat the particles, that 4 msec can reasonably be included in the 20 msec pressing time. There will be a similar time required for the particle tops in contact with the belt 24 to flatten and be cast against the belt surface. Any additional time being pressed by the pressing component may not provide additional benefit. Therefore, in an exemplary embodiment, a target pressing time of the nip roller or other pressing component is about 40 msec. For a 12 ips belt, this is a 0.48" contact width of the pressing component (e.g., nip length). A longer contact width of the pressing component can be beneficial for a faster belt speed.

Using disclosed embodiments, improvements in layer build time can be achieved. For example, moving the heater 74 against or closer to the transfuse roller, while maintaining the cooling and belt speed constant at conventional rates, layer build rate can be increased by around 20%. If the belt speed is increased to 24 ips, and a heater 74 capable of dosing with higher amounts of heat energy (e.g., utilizing a 12 bulb array at full intensity and placed just upstream of the transfuse roller 70) is utilized, layer rates can be improved by as much as 100% depending upon the cooling rate that can be achieved by cooler 76.

The upper range which will not result in degradation of the build material is determined by the time and temperature dependent thermal-degradation kinetics threshold (TDKT) as described above.

Figure 10:
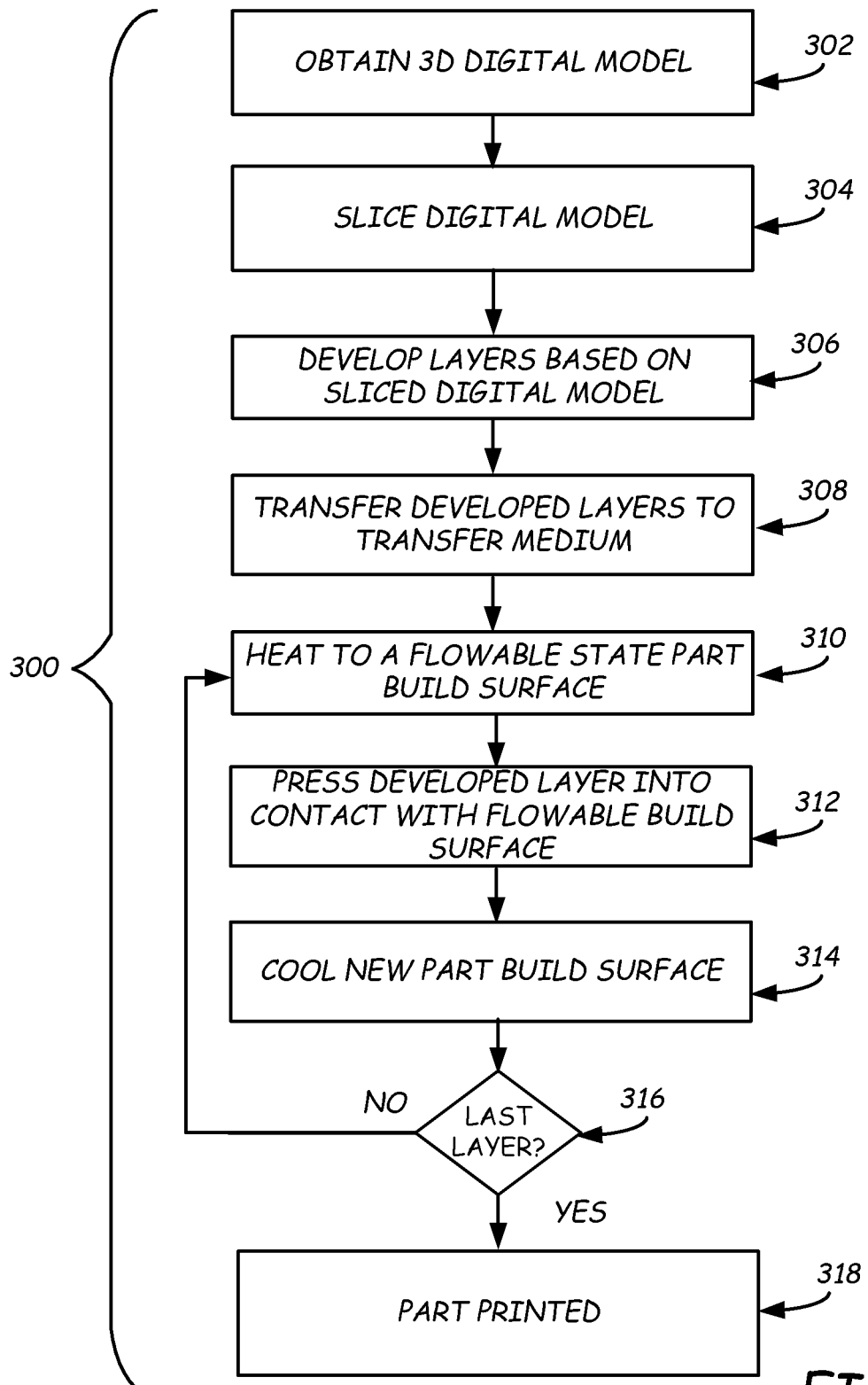
FIG. 10 is a flow chart of a method for printing a part in accordance with exemplary embodiments.

Referring now to FIG. 10, shown is one exemplary embodiment of a method 300 for printing a part using an electrophotographic (EP) additive manufacturing system in accordance with embodiments and concepts discussed above. Disclosed methods, such as shown in FIG. 10, are implement for example in suitably configured or programmed controllers such as controllers 36 and/or 38 in exemplary systems. As shown at step 302, a digital model of the 3D part to be printed is obtained, and at step 304, the digital model is sliced. The digital model slices can then be stored on a computer readable medium and/or output for printing on an EP manufacturing system. While in some embodiments method 300 includes steps 302 and 304, in other embodiments steps 302 and 304 can be omitted and the method can instead begin with a step of obtaining sliced digital model data.

At step 306, layers 22 of a powder material are developed using at least one EP engine 12. The developed layers are transferred at step 308 from the one or more EP engines to a transfer medium such as transfer belt 24. Next, steps 310, 312 and 314 are performed repeatedly, in sequence, for each of multiple developed layers to be transferred to a build surface 88 of the part 26. At step 310, the part build surface is heated (e.g., using heater 74) to a temperature in a range which is between the flowable temperature and a temperature below the thermal oxidation threshold to form a flowable part build surface. In some exemplary embodiments, the step of heating the part build surface to the temperature at or above the flowable temperature to form the flowable part build surface occurs in a heat time $\tau_{heat}$ satisfying the relationship $\tau_{heat} < 4\ s^2/\kappa$, where s is a diameter of particles of the powder material and $\kappa$ is the thermal diffusivity of the powder material. In some embodiments, heating the part build surface to at least the flowable temperature to form the flowable part build surface occurs in a heat time $\tau_{heat}$ such that a thermal diffusion distance of heat added during the heating is less than four developed layer thicknesses.

At step 312, one of the developed layers on the transfer medium is pressed into contact with the flowable part build surface to place the flowable part build surface into intimate contact with the developed layer. This heats the developed layers to a flowable state by conduction from the part build surface to form a new part build surface.

At step 314, the new part build surface is cooled to remove the heat energy added during heating step 310. At step 316, a determination is made as to whether the last developed layer has been deposited. If the last layer has been deposited, then at final step 318 the part is printed. If the last layer has not been deposited, then steps 310, 312 and 314 are repeated for the next developed layer. By repeating steps 310, 312 and 314 for each layer to be transfused to the part build surface, the part is built in a layer-by-layer manner, but with each layer being fully consolidated before the next developed layer is transfused. This produces a part with fewer voids or pores, if any, and allows build times for each layer to be reduced.

In some embodiments, after heating the part build surface to the temperature at or above the flowable temperature, but below the thermal oxidation threshold, at step 310 and prior to pressing one of the developed layers on the transfer medium into contact with the flowable part build surface at step 312, the method includes transporting the part build surface (e.g., using gantry 80) to a pressing component (e.g., nip roller 70) over a short time period time $\tau_{trans}$, satisfying the relationship time $\tau_{trans} < 4\ s^2/\kappa$, in order to restrict a depth of heat diffusion into the part from the part build surface.

In some embodiments, the rate at which the part is moved is controlled such that, after pressing a developed layer on the transfer medium into contact with the flowable part build surface, a delay or waiting time of at least a $20^{th}$ of the reptation time $\tau_d$ for the powder material of the developed layer at an interface temperature between the developed layer and the flowable build surface occurs before cooling is initiated to remove heat energy.

In some embodiments, in step 314 of cooling the new part build surface to remove heat energy, approximately the same energy flux is removed as was added during the step of heating. By rapidly heating the build surface to form a flowable build surface, pressing a developed layer into the flowable build surface to form a fully consolidated layer of the part, and rapidly cooling the part, degradation of the part material is avoided. In some embodiments, the sequential steps of heating, pressing and cooling are all completed in a layer time $\tau_{layer}$ greater than $\tau_{heat}\ \tau_d/20$, where the $\tau_d$ is the reptation time for the powder material of the developed layer. This layer time can be substantially shorter than a layer time required for conventional EP printing processes, and in some embodiments the layer time is less than one second.

Although the present disclosure has been described with reference to preferred embodiments, workers skilled in the art will recognize that changes may be made in form and detail without departing from the spirit and scope of the disclosure.

What is claimed is:

1. A method for printing a 3D part with a selective deposition based additive manufacturing system, the method comprising:
    developing layers of a powder material using at least one electrostatographic engine;
    transferring the developed layers from the at least one electrostatographic engine to a transfer medium;
    heating a part build surface of the 3D part on the build platform to a temperature above a fusion temperature and within a range between a flowable temperature and a thermal oxidation threshold to form a flowable part build surface;
    pressing one of the developed layers on the transfer medium into contact with the flowable part build surface to place the flowable part build surface into intimate contact with the one of the developed layers and thereby heating the one of the developed layers to a flowable state by conduction from the part build surface to form a new part build surface;
    cooling the new part build surface to remove heat energy; and
    repeating sequentially for each subsequent one of the developed layers the steps of heating the part build surface to form the flowable part build surface, pressing one of the developed layers on the transfer medium into contact with the flowable part build surface to form a new part build surface, and cooling the new part build surface to remove heat energy to form the 3D part in a layer-by-layer manner;
    wherein heating the part build surface to the temperature to form the flowable part build surface occurs in a heat time $\tau_{heat}$ such that a thermal diffusion distance of heat added during the heating is less than four developed layer thicknesses.

2. The method of claim 1, wherein heating the part build surface to the temperature to form the flowable part build surface occurs in a heat time $\tau_{heat}$ satisfying the relationship:

$$\tau_{heat} < 4\ s^2/\kappa$$

where s is a diameter of particles of the powder material and $\kappa$ is the thermal diffusivity of the powder material.

3. The method of claim 2, and after heating the part build surface to the temperature and prior to pressing one of the developed layers on the transfer medium into contact with the flowable part build surface, further comprising transporting the part build surface to a pressing component over a time $\tau_{trans}$ satisfying the relationship time $\tau_{trans} < 4\ s^2/\kappa$ in order to restrict a depth of heat diffusion into the part from the part build surface.

4. The method of claim 1, wherein after pressing the one of the developed layers on the transfer medium into contact with the flowable part build surface and prior to cooling the new part build surface to remove heat energy, further comprising waiting at least a $20^{th}$ of the reptation time $\tau_d$ for the powder material of the developed layer at an interface temperature between the developed layer and the flowable build surface.

5. The method of claim 1, wherein cooling the new part build surface to remove heat energy comprises cooling the new part build surface to remove approximately a same energy flux as was added during the step of heating.

6. The method of claim 2, wherein for each one of the developed layers, the sequential steps of heating, pressing and cooling are all completed in a layer time $\tau_{layer}$ greater than $\tau_{heat} + \tau_d/20$, where the $\tau_d$ is the reptation time for the powder material of the developed layer.

7. The method of claim 1, wherein for each one of the developed layers, the sequential steps of heating pressing, cooling are completed in less than one second.

8. The method of claim 1, wherein the developed layers comprise part material and support material.

9. The method of claim 1, wherein the transferring step comprises utilizing a continuous belt to move the developed layers from the EP engine to being in contact with the 3D part being printed.

10. The method of claim 1, wherein repeating sequentially for each subsequent one of the developed layers the steps of heating the part build surface to the temperature to form the flowable part build surface, pressing one of the developed layers on the transfer medium into contact with the flowable part build surface to form a new part build surface, and cooling the new part build surface to remove heat energy to form the 3D part in a layer-by-layer manner results in each of the developed layers being fulling consolidated with the part build surface before repeating the steps for a subsequent developed layer.

11. A method for printing a 3D part with a selective deposition based additive manufacturing system, the method comprising:
    developing layers of a powder material using at least one electrostatographic engine;
    transferring the developed layers from the at least one electrostatographic engine to a transfer belt;
    heating a part build surface of the 3D part on the build platform to a temperature at or above a flowable temperature to form a flowable part build surface;
    pressing, using a nip roller, one of the developed layers on the transfer belt into contact with the flowable part build surface to place the flowable part build surface into intimate contact with the one of the developed layers and thereby heating the one of the developed layers to a flowable state by conduction from the part build surface to form a new part build surface with the one of the developed layers being fully consolidated;
    cooling the new part build surface to remove heat energy added during the heating step; and
    repeating sequentially for each subsequent one of the developed layers the steps of heating the part build surface to form the flowable part build surface, pressing one of the developed layers on the transfer belt into contact with the flowable part build surface to form a new part build surface, and cooling the new part build surface to remove heat energy added during the heating step to form the 3D part in a layer-by-layer manner;
    wherein heating the part build surface to form the flowable part build surface occurs in a heat time $\tau_{heat}$ satisfying the relationship:

$$\tau_{heat} < 4\ s^2/\kappa$$

where s is a diameter of particles of the powder material and $\kappa$ is the thermal diffusivity of the powder material.

12. The method of claim 11, wherein heating the part build surface to form the flowable part build surface occurs in a heat time $\tau_{heat}$ such that a thermal diffusion distance of heat added during the heating is less than four developed layer thicknesses.

13. The method of claim 11, and after heating the part build surface and prior to pressing one of the developed layers on the transfer belt into contact with the flowable part build surface, further comprising transporting the part build surface to the nip roller over a time $\tau_{trans}$ satisfying the relationship time $\tau_{trans} < 4 \text{ s}^2/\kappa$ in order to restrict a depth of heat diffusion into the part from the part build surface.

14. The method of claim 13, wherein after pressing the one of the developed layers on the transfer medium into contact with the flowable part build surface and prior to cooling the new part build surface to remove heat energy, further comprising waiting at least a 20$^{th}$ of the reptation time $\tau_d$ for the powder material of the developed layer at an interface temperature between the developed layer and the flowable build surface.

15. The method of claim 14, wherein cooling the new part build surface to remove heat energy comprises cooling the new part build surface to remove approximately a same energy flux as was added during the step of heating.

16. The method of claim 11, wherein for each one of the developed layers, the sequential steps of heating, pressing and cooling are all completed in a layer time $\tau_{layer}$ greater than $\tau_{heat} + \tau_d/20$, where $\tau_{heat}$ is a heating time and $\tau_d$ is the reptation time for the powder material of the developed layer.

17. The method of claim 11, wherein the flowable temperature is approximately 350° C.

18. A method for printing a 3D part with a selective deposition based additive manufacturing system, the method comprising:

developing layers of a powder material using at least one electrostatographic engine;

transferring the developed layers from the at least one electrostatographic engine to a transfer medium;

heating a part build surface of the 3D part on the build platform to a temperature within a range between a flowable temperature and a thermal oxidation threshold to form a flowable part build surface, wherein heating the part build surface to the temperature to form the flowable part build surface occurs in a heat time $\tau_{heat}$ such that a thermal diffusion distance of heat added during the heating is less than four developed layer thicknesses;

pressing one of the developed layers on the transfer medium into contact with the flowable part build surface to place the flowable part build surface into intimate contact with the one of the developed layers and thereby heating the one of the developed layers to a flowable state by conduction from the part build surface to form a new part build surface;

cooling the new part build surface to remove heat energy; and repeating sequentially for each subsequent one of the developed layers the steps of heating the part build surface to form the flowable part build surface, pressing one of the developed layers on the transfer medium into contact with the flowable part build surface to form a new part build surface, and cooling the new part build surface to remove heat energy to form the 3D part in a layer-by-layer manner.

* * * * *